United States Patent
Nainar et al.

(10) Patent No.: US 11,252,063 B2
(45) Date of Patent: **\*Feb. 15, 2022**

(54) SYSTEM AND METHOD FOR OBTAINING MICRO-SERVICE TELEMETRY DATA

(71) Applicant: Cisco Technology, Inc., San Jose, CA (US)

(72) Inventors: Nagendra Kumar Nainar, Morrisville, NC (US); Rajiv Asati, Morrisville, NC (US); Carlos M. Pignataro, Cary, NC (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 45 days.

This patent is subject to a terminal disclaimer.

(21) Appl. No.: 16/745,035

(22) Filed: Jan. 16, 2020

(65) Prior Publication Data

US 2020/0153716 A1 May 14, 2020

Related U.S. Application Data

(63) Continuation of application No. 15/793,557, filed on Oct. 25, 2017, now Pat. No. 10,541,893.

(51) Int. Cl.
*G06F 15/173* (2006.01)
*H04L 12/26* (2006.01)

(52) U.S. Cl.
CPC .......... *H04L 43/062* (2013.01); *H04L 43/026* (2013.01); *H04L 43/12* (2013.01); *H04L 43/04* (2013.01); *H04L 43/0876* (2013.01)

(58) Field of Classification Search
USPC ................ 370/235, 237, 252, 389, 236, 429
See application file for complete search history.

(56) References Cited

U.S. PATENT DOCUMENTS

| 3,629,512 A | 12/1971 | Yuan |
| 4,769,811 A | 9/1988 | Eckberg, Jr. et al. |

(Continued)

FOREIGN PATENT DOCUMENTS

| CN | 103716123 | 4/2014 |
| CN | 103716137 | 4/2014 |

(Continued)

OTHER PUBLICATIONS

Aldrin, S., et al. "Service Function Chaining Operation, Administration and Maintenance Framework," Internet Engineering Task Force, Oct. 26, 2014, 13 pages.

(Continued)

*Primary Examiner* — Quang N Nguyen
(74) *Attorney, Agent, or Firm* — Polsinelli PC

(57) ABSTRACT

Systems, methods, and computer-readable media are disclosed for use of an overlay network termination endpoint as a proxy to collect telemetry data for micro-services or specific applications provided by containers in overlay data centers. In one aspect of the present disclosure, a method includes receiving, at a controller, a probe for flow statistics associated with a service path, the probe including corresponding flow identification information, extracting the corresponding flow identification information from the probe, obtaining the flow statistics from an agent based on the flow identification information, the agent being configured to manage a plurality of containers, generating a response packet including the flow statistics obtained from the agent and sending the response packet to an initiator from which the query is received.

19 Claims, 10 Drawing Sheets

(56) References Cited

U.S. PATENT DOCUMENTS

| | | | |
|---|---|---|---|
| 5,408,231 A | 4/1995 | Bowdon | |
| 5,491,690 A | 2/1996 | Alfonsi et al. | |
| 5,557,609 A | 9/1996 | Shobatake et al. | |
| 5,600,638 A | 2/1997 | Bertin et al. | |
| 5,687,167 A | 11/1997 | Bertin et al. | |
| 6,115,384 A | 9/2000 | Parzych | |
| 6,167,438 A | 12/2000 | Yates et al. | |
| 6,400,681 B1 | 6/2002 | Bertin et al. | |
| 6,430,160 B1 | 8/2002 | Smith et al. | |
| 6,661,797 B1 | 12/2003 | Goel et al. | |
| 6,687,229 B1 | 2/2004 | Kataria et al. | |
| 6,799,270 B1 | 9/2004 | Bull et al. | |
| 6,888,828 B1 | 5/2005 | Partanen et al. | |
| 6,934,749 B1 * | 8/2005 | Black | G06F 1/14 709/217 |
| 6,993,593 B2 | 1/2006 | Iwata | |
| 7,027,408 B2 | 4/2006 | Nabkel et al. | |
| 7,062,567 B2 | 6/2006 | Benitez et al. | |
| 7,095,715 B2 | 8/2006 | Buckman et al. | |
| 7,096,212 B2 | 8/2006 | Tribble et al. | |
| 7,139,239 B2 | 11/2006 | Mcfarland et al. | |
| 7,165,107 B2 | 1/2007 | Pouyoul et al. | |
| 7,197,008 B1 | 3/2007 | Shabtay et al. | |
| 7,197,660 B1 | 3/2007 | Liu et al. | |
| 7,209,435 B1 | 4/2007 | Kuo et al. | |
| 7,227,872 B1 | 6/2007 | Biswas et al. | |
| 7,231,462 B2 | 6/2007 | Berthaud et al. | |
| 7,333,990 B1 | 2/2008 | Thiagarajan et al. | |
| 7,443,796 B1 | 10/2008 | Albert et al. | |
| 7,458,084 B2 | 11/2008 | Zhang et al. | |
| 7,472,411 B2 | 12/2008 | Wing et al. | |
| 7,486,622 B2 | 2/2009 | Regan et al. | |
| 7,536,396 B2 | 5/2009 | Johnson et al. | |
| 7,552,201 B2 | 6/2009 | Areddu et al. | |
| 7,558,261 B2 | 7/2009 | Arregoces et al. | |
| 7,567,504 B2 | 7/2009 | Darling et al. | |
| 7,571,470 B2 | 8/2009 | Arregoces et al. | |
| 7,573,879 B2 | 8/2009 | Narad et al. | |
| 7,610,375 B2 | 10/2009 | Portolani et al. | |
| 7,643,468 B1 | 1/2010 | Arregoces et al. | |
| 7,644,182 B2 | 1/2010 | Banerjee et al. | |
| 7,647,422 B2 | 1/2010 | Singh et al. | |
| 7,657,898 B2 | 2/2010 | Sadiq | |
| 7,657,940 B2 | 2/2010 | Portolani et al. | |
| 7,668,116 B2 | 2/2010 | Wijnands et al. | |
| 7,684,321 B2 | 3/2010 | Muirhead et al. | |
| 7,738,469 B1 | 6/2010 | Shekokar et al. | |
| 7,751,409 B1 | 7/2010 | Carolan | |
| 7,793,157 B2 | 9/2010 | Bailey et al. | |
| 7,814,284 B1 | 10/2010 | Glass et al. | |
| 7,831,693 B2 | 11/2010 | Lai | |
| 7,852,785 B2 | 12/2010 | Lund et al. | |
| 7,860,095 B2 | 12/2010 | Forissier et al. | |
| 7,860,100 B2 | 12/2010 | Khalid et al. | |
| 7,895,425 B2 | 2/2011 | Khalid et al. | |
| 7,899,012 B2 | 3/2011 | Ho et al. | |
| 7,899,861 B2 | 3/2011 | Feblowitz et al. | |
| 7,907,595 B2 | 3/2011 | Khanna et al. | |
| 7,908,480 B2 | 3/2011 | Firestone et al. | |
| 7,940,685 B1 | 5/2011 | Breslau et al. | |
| 7,983,174 B1 | 7/2011 | Monaghan et al. | |
| 7,990,847 B1 | 8/2011 | Leroy et al. | |
| 8,000,329 B2 | 8/2011 | Fendick et al. | |
| 8,018,938 B1 | 9/2011 | Fromm et al. | |
| 8,094,575 B1 | 1/2012 | Vadlakonda et al. | |
| 8,095,683 B2 | 1/2012 | Balasubramaniam Chandra | |
| 8,116,307 B1 | 2/2012 | Thesayi et al. | |
| 8,166,465 B2 | 4/2012 | Feblowitz et al. | |
| 8,180,909 B2 | 5/2012 | Hartman et al. | |
| 8,191,119 B2 | 5/2012 | Wing et al. | |
| 8,195,774 B2 | 6/2012 | Lambeth et al. | |
| 8,280,354 B2 | 10/2012 | Smith et al. | |
| 8,281,302 B2 | 10/2012 | Durazzo et al. | |
| 8,291,108 B2 | 10/2012 | Raja et al. | |
| 8,305,900 B2 | 11/2012 | Bianconi | |
| 8,311,045 B2 | 11/2012 | Quinn et al. | |
| 8,316,457 B1 | 11/2012 | Paczkowski et al. | |
| 8,355,332 B2 | 1/2013 | Beaudette et al. | |
| 8,442,043 B2 | 5/2013 | Sharma et al. | |
| 8,451,817 B2 | 5/2013 | Cheriton | |
| 8,464,336 B2 | 6/2013 | Wei et al. | |
| 8,473,981 B1 | 6/2013 | Gargi | |
| 8,479,298 B2 | 7/2013 | Keith et al. | |
| 8,498,414 B2 | 7/2013 | Rossi | |
| 8,520,672 B2 | 8/2013 | Guichard et al. | |
| 8,601,152 B1 | 12/2013 | Chou | |
| 8,605,588 B2 | 12/2013 | Sankaran et al. | |
| 8,612,612 B1 | 12/2013 | Dukes et al. | |
| 8,627,328 B2 | 1/2014 | Mousseau et al. | |
| 8,645,952 B2 | 2/2014 | Biswas et al. | |
| 8,676,965 B2 | 3/2014 | Gueta | |
| 8,676,980 B2 | 3/2014 | Kreeger et al. | |
| 8,700,892 B2 | 4/2014 | Bollay et al. | |
| 8,724,466 B2 | 5/2014 | Kenigsberg et al. | |
| 8,730,980 B2 | 5/2014 | Bagepalli et al. | |
| 8,743,885 B2 | 6/2014 | Khan et al. | |
| 8,751,420 B2 | 6/2014 | Hjelm et al. | |
| 8,762,534 B1 | 6/2014 | Hong et al. | |
| 8,762,707 B2 | 6/2014 | Killian et al. | |
| 8,792,490 B2 | 7/2014 | Jabr et al. | |
| 8,793,400 B2 | 7/2014 | Mcdysan et al. | |
| 8,812,730 B2 | 8/2014 | Vos et al. | |
| 8,819,419 B2 | 8/2014 | Carlson et al. | |
| 8,825,070 B2 | 9/2014 | Akhtar et al. | |
| 8,830,834 B2 | 9/2014 | Sharma et al. | |
| 8,904,037 B2 | 12/2014 | Haggar et al. | |
| 8,984,284 B2 | 3/2015 | Purdy, Sr. et al. | |
| 9,001,827 B2 | 4/2015 | Appenzeller | |
| 9,071,533 B2 | 6/2015 | Hui et al. | |
| 9,077,661 B2 | 7/2015 | Andreasen et al. | |
| 9,088,584 B2 | 7/2015 | Feng et al. | |
| 9,130,872 B2 | 9/2015 | Kumar et al. | |
| 9,143,438 B2 | 9/2015 | Khan et al. | |
| 9,160,797 B2 | 10/2015 | Mcdysan | |
| 9,178,812 B2 | 11/2015 | Guichard et al. | |
| 9,189,285 B2 | 11/2015 | Ng et al. | |
| 9,203,711 B2 | 12/2015 | Agarwal et al. | |
| 9,253,274 B2 | 2/2016 | Quinn et al. | |
| 9,300,579 B2 | 3/2016 | Frost et al. | |
| 9,300,585 B2 | 3/2016 | Kumar et al. | |
| 9,311,130 B2 | 4/2016 | Christenson et al. | |
| 9,319,324 B2 | 4/2016 | Beheshti-Zavareh et al. | |
| 9,325,565 B2 | 4/2016 | Yao et al. | |
| 9,338,097 B2 | 5/2016 | Anand et al. | |
| 9,344,337 B2 | 5/2016 | Kumar et al. | |
| 9,374,297 B2 | 6/2016 | Bosch et al. | |
| 9,379,931 B2 | 6/2016 | Bosch et al. | |
| 9,385,950 B2 | 7/2016 | Quinn et al. | |
| 9,398,486 B2 | 7/2016 | La Roche, Jr. et al. | |
| 9,407,540 B2 | 8/2016 | Kumar et al. | |
| 9,413,655 B2 | 8/2016 | Shatzkamer et al. | |
| 9,424,065 B2 | 8/2016 | Singh et al. | |
| 9,436,443 B2 | 9/2016 | Chiosi et al. | |
| 9,444,675 B2 | 9/2016 | Guichard et al. | |
| 9,473,570 B2 | 10/2016 | Bhanujan et al. | |
| 9,479,443 B2 | 10/2016 | Bosch et al. | |
| 9,491,094 B2 | 11/2016 | Patwardhan et al. | |
| 9,537,836 B2 | 1/2017 | Maller et al. | |
| 9,558,029 B2 | 1/2017 | Behera et al. | |
| 9,559,970 B2 | 1/2017 | Kumar et al. | |
| 9,571,405 B2 | 2/2017 | Pignataro et al. | |
| 9,608,896 B2 | 3/2017 | Kumar et al. | |
| 9,614,739 B2 | 4/2017 | Kumar et al. | |
| 9,660,909 B2 | 5/2017 | Guichard et al. | |
| 9,723,106 B2 | 8/2017 | Shen et al. | |
| 9,774,533 B2 | 9/2017 | Zhang et al. | |
| 9,794,379 B2 | 10/2017 | Kumar et al. | |
| 9,882,776 B2 | 1/2018 | Aybay et al. | |
| 9,929,945 B2 | 3/2018 | Schultz et al. | |
| 10,003,530 B2 | 6/2018 | Zhang et al. | |
| 2001/0023442 A1 | 9/2001 | Masters | |
| 2002/0085562 A1 | 7/2002 | Hufferd et al. | |
| 2002/0131362 A1 | 9/2002 | Callon | |
| 2002/0156893 A1 | 10/2002 | Pouyoul et al. | |

(56) References Cited

U.S. PATENT DOCUMENTS

| | | |
|---|---|---|
| 2002/0167935 A1 | 11/2002 | Nabkel et al. |
| 2003/0023879 A1 | 1/2003 | Wray |
| 2003/0026257 A1 | 2/2003 | Xu et al. |
| 2003/0037070 A1 | 2/2003 | Marston |
| 2003/0088698 A1 | 5/2003 | Singh et al. |
| 2003/0110081 A1 | 6/2003 | Tosaki et al. |
| 2003/0120816 A1 | 6/2003 | Berthaud et al. |
| 2003/0126233 A1* | 7/2003 | Bryers ............... H04L 29/06 709/219 |
| 2003/0214913 A1 | 11/2003 | Kan et al. |
| 2003/0226142 A1 | 12/2003 | Rand |
| 2004/0109412 A1 | 6/2004 | Hansson et al. |
| 2004/0148391 A1 | 7/2004 | Shannon, Sr. et al. |
| 2004/0199812 A1 | 10/2004 | Earl |
| 2004/0213160 A1 | 10/2004 | Regan et al. |
| 2004/0264481 A1 | 12/2004 | Darling et al. |
| 2004/0268357 A1 | 12/2004 | Joy et al. |
| 2005/0044197 A1 | 2/2005 | Lai |
| 2005/0058118 A1 | 3/2005 | Davis |
| 2005/0060572 A1 | 3/2005 | Kung |
| 2005/0086367 A1 | 4/2005 | Conta et al. |
| 2005/0120101 A1 | 6/2005 | Nocera |
| 2005/0152378 A1 | 7/2005 | Bango et al. |
| 2005/0157645 A1 | 7/2005 | Rabie et al. |
| 2005/0160180 A1 | 7/2005 | Rabje et al. |
| 2005/0204042 A1 | 9/2005 | Banerjee et al. |
| 2005/0210096 A1 | 9/2005 | Bishop et al. |
| 2005/0257002 A1 | 11/2005 | Nguyen |
| 2005/0281257 A1 | 12/2005 | Yazaki et al. |
| 2005/0286540 A1 | 12/2005 | Hurtta et al. |
| 2005/0289244 A1 | 12/2005 | Sahu et al. |
| 2006/0005240 A1 | 1/2006 | Sundarrajan et al. |
| 2006/0031374 A1 | 2/2006 | Lu et al. |
| 2006/0045024 A1 | 3/2006 | Previdi et al. |
| 2006/0074502 A1 | 4/2006 | Mcfarland |
| 2006/0092950 A1 | 5/2006 | Arregoces et al. |
| 2006/0095960 A1 | 5/2006 | Arregoces et al. |
| 2006/0112400 A1 | 5/2006 | Zhang et al. |
| 2006/0155862 A1 | 7/2006 | Kathi et al. |
| 2006/0168223 A1 | 7/2006 | Mishra et al. |
| 2006/0233106 A1 | 10/2006 | Achlioptas et al. |
| 2006/0233155 A1 | 10/2006 | Srivastava |
| 2006/0291473 A1 | 12/2006 | Chase et al. |
| 2007/0061441 A1 | 3/2007 | Landis et al. |
| 2007/0067435 A1 | 3/2007 | Landis et al. |
| 2007/0094397 A1 | 4/2007 | Krelbaum et al. |
| 2007/0143851 A1 | 6/2007 | Nicodemus et al. |
| 2007/0237147 A1 | 10/2007 | Quinn et al. |
| 2007/0250836 A1 | 10/2007 | Li et al. |
| 2008/0056153 A1 | 3/2008 | Liu |
| 2008/0080509 A1 | 4/2008 | Khanna et al. |
| 2008/0080517 A1 | 4/2008 | Roy et al. |
| 2008/0170542 A1 | 7/2008 | Hu |
| 2008/0177896 A1 | 7/2008 | Quinn et al. |
| 2008/0181118 A1 | 7/2008 | Sharma et al. |
| 2008/0196083 A1 | 8/2008 | Parks et al. |
| 2008/0209039 A1 | 8/2008 | Tracey et al. |
| 2008/0219287 A1 | 9/2008 | Krueger et al. |
| 2008/0225710 A1 | 9/2008 | Raja et al. |
| 2008/0291910 A1 | 11/2008 | Tadimeti et al. |
| 2009/0003364 A1 | 1/2009 | Fendick et al. |
| 2009/0006152 A1 | 1/2009 | Timmerman et al. |
| 2009/0037713 A1 | 2/2009 | Khalid et al. |
| 2009/0094684 A1 | 4/2009 | Chinnusamy et al. |
| 2009/0204612 A1 | 8/2009 | Keshavarz-nia et al. |
| 2009/0271656 A1 | 10/2009 | Yokota et al. |
| 2009/0300207 A1 | 12/2009 | Giaretta et al. |
| 2009/0305699 A1 | 12/2009 | Deshpande et al. |
| 2009/0328054 A1 | 12/2009 | Paramasivam et al. |
| 2010/0058329 A1 | 3/2010 | Durazzo et al. |
| 2010/0063988 A1 | 3/2010 | Khalid |
| 2010/0080226 A1 | 4/2010 | Khalid |
| 2010/0165985 A1 | 7/2010 | Sharma et al. |
| 2010/0191612 A1 | 7/2010 | Raleigh |
| 2010/0211658 A1 | 8/2010 | Hoogerwerf et al. |
| 2011/0010585 A1 | 1/2011 | Bugenhagen et al. |
| 2011/0023090 A1 | 1/2011 | Asati et al. |
| 2011/0032833 A1 | 2/2011 | Zhang et al. |
| 2011/0055845 A1 | 3/2011 | Nandagopal et al. |
| 2011/0131338 A1 | 6/2011 | Hu |
| 2011/0137991 A1 | 6/2011 | Russell |
| 2011/0142056 A1 | 6/2011 | Manoj |
| 2011/0161494 A1 | 6/2011 | Mcdysan et al. |
| 2011/0164503 A1* | 7/2011 | Yong ............... H04L 69/22 370/237 |
| 2011/0222412 A1 | 9/2011 | Kompella |
| 2011/0255538 A1 | 10/2011 | Srinivasan et al. |
| 2011/0267947 A1 | 11/2011 | Dhar et al. |
| 2012/0131662 A1 | 5/2012 | Kuik et al. |
| 2012/0147894 A1 | 6/2012 | Mulligan et al. |
| 2012/0324442 A1 | 12/2012 | Barde |
| 2012/0331135 A1 | 12/2012 | Alon et al. |
| 2013/0003735 A1 | 1/2013 | Chao et al. |
| 2013/0003736 A1 | 1/2013 | Szyszko et al. |
| 2013/0040640 A1 | 2/2013 | Chen et al. |
| 2013/0044636 A1 | 2/2013 | Koponen et al. |
| 2013/0121137 A1 | 5/2013 | Feng et al. |
| 2013/0124708 A1 | 5/2013 | Lee et al. |
| 2013/0163594 A1 | 6/2013 | Sharma et al. |
| 2013/0163606 A1 | 6/2013 | Bagepalli et al. |
| 2013/0238806 A1 | 9/2013 | Moen |
| 2013/0272305 A1 | 10/2013 | Lefebvre et al. |
| 2013/0294236 A1 | 11/2013 | Beheshti-Zavareh et al. |
| 2013/0311675 A1 | 11/2013 | Kancherla |
| 2013/0329584 A1 | 12/2013 | Ghose et al. |
| 2014/0010083 A1 | 1/2014 | Hamdi et al. |
| 2014/0010096 A1 | 1/2014 | Kamble et al. |
| 2014/0036730 A1 | 2/2014 | Nellikar et al. |
| 2014/0050223 A1 | 2/2014 | Foo et al. |
| 2014/0067758 A1 | 3/2014 | Boldyrev et al. |
| 2014/0105062 A1 | 4/2014 | McDysan et al. |
| 2014/0181267 A1 | 6/2014 | Wadkins et al. |
| 2014/0254603 A1 | 9/2014 | Banavalikar et al. |
| 2014/0259012 A1 | 9/2014 | Nandlall et al. |
| 2014/0279863 A1 | 9/2014 | Krishnamurthy et al. |
| 2014/0280836 A1 | 9/2014 | Kumar et al. |
| 2014/0317261 A1 | 10/2014 | Shatzkamer et al. |
| 2014/0321459 A1 | 10/2014 | Kumar et al. |
| 2014/0334295 A1 | 11/2014 | Guichard et al. |
| 2014/0344439 A1 | 11/2014 | Kempf et al. |
| 2014/0362682 A1 | 12/2014 | Guichard et al. |
| 2014/0362857 A1 | 12/2014 | Guichard et al. |
| 2014/0369209 A1 | 12/2014 | Khurshid et al. |
| 2014/0376558 A1 | 12/2014 | Rao et al. |
| 2015/0003455 A1 | 1/2015 | Haddad et al. |
| 2015/0012584 A1 | 1/2015 | Lo et al. |
| 2015/0012988 A1 | 1/2015 | Jeng et al. |
| 2015/0016469 A1* | 1/2015 | Ganichev ............... H04L 49/90 370/429 |
| 2015/0029849 A1* | 1/2015 | Frost ............... H04L 47/125 370/235 |
| 2015/0029871 A1 | 1/2015 | Frost et al. |
| 2015/0032871 A1 | 1/2015 | Allan et al. |
| 2015/0052516 A1 | 2/2015 | French et al. |
| 2015/0071285 A1 | 3/2015 | Kumar et al. |
| 2015/0074276 A1 | 3/2015 | DeCusatis et al. |
| 2015/0082308 A1 | 3/2015 | Kiess et al. |
| 2015/0085635 A1 | 3/2015 | Wijnands et al. |
| 2015/0085870 A1 | 3/2015 | Narasimha et al. |
| 2015/0089082 A1 | 3/2015 | Patwardhan et al. |
| 2015/0092564 A1 | 4/2015 | Aldrin |
| 2015/0103827 A1 | 4/2015 | Quinn et al. |
| 2015/0117308 A1 | 4/2015 | Kant |
| 2015/0124622 A1 | 5/2015 | Kovvali et al. |
| 2015/0131484 A1 | 5/2015 | Aldrin |
| 2015/0131660 A1 | 5/2015 | Shepherd et al. |
| 2015/0156035 A1 | 6/2015 | Foo et al. |
| 2015/0180725 A1 | 6/2015 | Varney et al. |
| 2015/0180767 A1 | 6/2015 | Tam et al. |
| 2015/0181309 A1 | 6/2015 | Shepherd et al. |
| 2015/0188949 A1 | 7/2015 | Mahaffey et al. |
| 2015/0195197 A1 | 7/2015 | Yong et al. |
| 2015/0222516 A1 | 8/2015 | Deval et al. |
| 2015/0222533 A1 | 8/2015 | Birrittella et al. |

(56) References Cited

U.S. PATENT DOCUMENTS

| | | | |
|---|---|---|---|
| 2015/0236948 A1 | 8/2015 | Dunbar et al. | |
| 2015/0281028 A1* | 10/2015 | Akhter | H04L 43/0858 |
| | | | 370/252 |
| 2015/0319078 A1 | 11/2015 | Lee et al. | |
| 2015/0319081 A1 | 11/2015 | Kasturi et al. | |
| 2015/0326473 A1 | 11/2015 | Dunbar et al. | |
| 2015/0333930 A1 | 11/2015 | Aysola et al. | |
| 2015/0334027 A1 | 11/2015 | Bosch et al. | |
| 2015/0341285 A1 | 11/2015 | Aysola et al. | |
| 2015/0365495 A1 | 12/2015 | Fan et al. | |
| 2015/0381465 A1 | 12/2015 | Narayanan et al. | |
| 2015/0381557 A1 | 12/2015 | Fan et al. | |
| 2016/0028604 A1 | 1/2016 | Chakrabarti et al. | |
| 2016/0028640 A1 | 1/2016 | Zhang et al. | |
| 2016/0043952 A1 | 2/2016 | Zhang et al. | |
| 2016/0050117 A1 | 2/2016 | Voellmy et al. | |
| 2016/0050132 A1 | 2/2016 | Zhang | |
| 2016/0080263 A1 | 3/2016 | Park et al. | |
| 2016/0099853 A1 | 4/2016 | Nedeltchev et al. | |
| 2016/0119159 A1 | 4/2016 | Zhao et al. | |
| 2016/0119253 A1 | 4/2016 | Kang et al. | |
| 2016/0127139 A1 | 5/2016 | Tian et al. | |
| 2016/0127227 A1* | 5/2016 | Lee | H04L 49/10 |
| | | | 370/389 |
| 2016/0134518 A1 | 5/2016 | Callon et al. | |
| 2016/0134535 A1 | 5/2016 | Callon | |
| 2016/0139939 A1 | 5/2016 | Bosch et al. | |
| 2016/0164776 A1 | 6/2016 | Biancaniello | |
| 2016/0165014 A1 | 6/2016 | Nainar et al. | |
| 2016/0173373 A1 | 6/2016 | Guichard et al. | |
| 2016/0173464 A1 | 6/2016 | Wang et al. | |
| 2016/0182336 A1 | 6/2016 | Doctor et al. | |
| 2016/0182342 A1 | 6/2016 | Singaravelu et al. | |
| 2016/0182684 A1 | 6/2016 | Connor et al. | |
| 2016/0212017 A1 | 7/2016 | Li et al. | |
| 2016/0226742 A1 | 8/2016 | Apathotharanan et al. | |
| 2016/0248685 A1 | 8/2016 | Pignataro et al. | |
| 2016/0277250 A1 | 9/2016 | Maes | |
| 2016/0285720 A1 | 9/2016 | Mäenpää et al. | |
| 2016/0323165 A1 | 11/2016 | Boucadair et al. | |
| 2016/0352629 A1 | 12/2016 | Wang et al. | |
| 2016/0380966 A1 | 12/2016 | Gunnalan et al. | |
| 2017/0019303 A1 | 1/2017 | Swamy et al. | |
| 2017/0031804 A1 | 2/2017 | Ciszewski et al. | |
| 2017/0078175 A1 | 3/2017 | Xu et al. | |
| 2017/0126475 A1 | 5/2017 | Mahkonen et al. | |
| 2017/0187609 A1 | 6/2017 | Lee et al. | |
| 2017/0208000 A1 | 7/2017 | Bosch et al. | |
| 2017/0214627 A1 | 7/2017 | Zhang et al. | |
| 2017/0237656 A1 | 8/2017 | Gage et al. | |
| 2017/0250917 A1 | 8/2017 | Ruckstuhl et al. | |
| 2017/0272470 A1 | 9/2017 | Gundamaraju et al. | |
| 2017/0279712 A1 | 9/2017 | Nainar et al. | |
| 2017/0310611 A1 | 10/2017 | Kumar et al. | |
| 2017/0331741 A1 | 11/2017 | Fedyk et al. | |
| 2017/0353383 A1 | 12/2017 | Hughes et al. | |
| 2018/0013841 A1 | 1/2018 | Nainar et al. | |
| 2018/0020077 A1* | 1/2018 | Folco | G06F 16/185 |
| 2018/0026884 A1 | 1/2018 | Nainar et al. | |
| 2018/0026887 A1 | 1/2018 | Nainar et al. | |
| 2018/0026893 A1* | 1/2018 | Jeuk | H04L 41/5051 |
| | | | 370/236 |
| 2018/0041470 A1 | 2/2018 | Schultz et al. | |
| 2018/0062991 A1 | 3/2018 | Nainar et al. | |
| 2018/0176134 A1* | 6/2018 | Pignataro | H04L 67/10 |
| 2018/0287422 A1* | 10/2018 | Seewald | H04L 41/20 |
| 2019/0238363 A1* | 8/2019 | Boutros | H04L 45/34 |

FOREIGN PATENT DOCUMENTS

| | | |
|---|---|---|
| EP | 3160073 | 4/2017 |
| JP | 2016149686 | 8/2016 |
| WO | WO 2011/029321 | 3/2011 |
| WO | WO 2012/056404 | 5/2012 |
| WO | WO 2015/065353 | 5/2015 |
| WO | WO 2015/180559 | 12/2015 |
| WO | WO 2015/187337 | 12/2015 |
| WO | WO 2016/004556 | 1/2016 |
| WO | WO 2016/058245 | 4/2016 |
| WO | WO 2017/011607 | 1/2017 |

OTHER PUBLICATIONS

Alizadeh, Mohammad, et al., "CONGA: Distributed Congestion-Aware Load Balancing for Datacenters," SIGCOMM '14, Aug. 17-22, 2014, 12 pages.

Author Unknown, "ANSI/SCTE 35 2007 Digital Program Insertion Cueing Message for Cable," Engineering Committee, Digital Video Subcommittee, American National Standard, Society of Cable Telecommunications Engineers, © Society of Cable Telecommunications Engineers, Inc. 2007 All Rights Reserved, 140 Philips Road, Exton, PA 19341; 42 pages.

Author Unknown, "AWS Lambda Developer Guide," Amazon Web Services Inc., May 2017, 416 pages.

Author Unknown, "CEA-708," from Wikipedia, the free encyclopedia, Nov. 15, 2012; 16 pages http://en.wikipedia.org/w/index.php?title=CEA-708&oldid=523143431.

Author Unknown, "Cisco and Intel High-Performance VNFs on Cisco NFV Infrastructure," White Paper, Cisco and Intel, Oct. 2016, 7 pages.

Author Unknown, "Cloud Functions Overview," Cloud Functions Documentation, Mar. 21, 2017, 3 pages; https://cloud.google.com/functions/docs/concepts/overview.

Author Unknown, "Cloud-Native VNF Modelling," Open Source Mano, © ETSI 2016, 18 pages.

Author Unknown, "Digital Program Insertion," from Wikipedia, the free encyclopedia, Jan. 2, 2012; 1 page http://en.wikipedia.org/w/index.php?title=Digital_Program_insertion&oldid=469076482.

Author Unknown, "Dynamic Adaptive Streaming over HTTP," from Wikipedia, the free encyclopedia, Oct. 25, 2012; 3 pages, http://en.wikipedia.org/w/index.php?title=Dynannic_Adaptive_Streanning_over_HTTP&oldid=519749189.

Author Unknown, "GStreamer and in-band metadata," from RidgeRun Developer Connection, Jun. 19, 2012, 5 pages https://developersidgerun.conn/wiki/index.php/GStreanner_and_in-band_nnetadata.

Author Unknown, "IEEE Standard for the Functional Architecture of Next Generation Service Overlay Networks, IEEE Std. 1903-2011," IEEE, Piscataway, NJ, Oct. 7, 2011; 147 pages.

Author Unknown, "ISO/IEC JTC 1/SC 29, Information Technology—Dynamic Adaptive Streaming over HTTP (DASH)—Part 1: Media Presentation Description and Segment Formats," International Standard © ISO/IEC 2012—All Rights Reserved; Jan. 5, 2012; 131 pages.

Author Unknown, "M-PEG 2 Transmission," © Dr. Gorry Fairhurst, 9 pages [Published on or about Jan. 12, 2012] http://www.erg.abdn.ac.uk/future-net/digital-video/mpeg2-trans.html.

Author Unknown, "MPEG Transport Stream," from Wikipedia, the free encyclopedia, Nov. 11, 2012; 7 pages, http://en.wikipedia.org/w/index.php?title=MPEG_transport_streann&oldid=522468296.

Author Unknown, "Network Functions Virtualisation (NFV); Use Cases," ETSI, GS NFV 001 v1.1.1, Architectural Framework, © European Telecommunications Standards Institute, Oct. 2013, 50 pages.

Author Unknown, "OpenNebula 4.6 User Guide," Jun. 12, 2014, opennebula.org, 87 pages.

Author Unknown, "Understanding Azure, A Guide for Developers," Microsoft Corporation, Copyright © 2016 Microsoft Corporation, 39 pages.

Author Unknown, "3GPP TR 23.803 V7.0.0 (Sep. 2005) Technical Specification: Group Services and System Aspects; Evolution of Policy Control and Charging (Release 7)," 3rd Generation Partnership Project (3GPP), 650 Route des Lucioles—Sophia Antipolis Valbonne—France, Sep. 2005; 30 pages.

Author Unknown, "3GPP TS 23.203 V8.9.0 (Mar. 2010) Technical Specification: Group Services and System Aspects; Policy and Charging Control Architecture (Release 8)," 3rd Generation Part-

(56) References Cited

OTHER PUBLICATIONS nership Project (3GPP), 650 Route des Lucioles—Sophia Antipolis Val bonne—France, Mar. 2010; 116 pages.

Author Unknown, "3GPP TS 23.401 V13.5.0 (Dec. 2015) Technical Specification: 3rd Generation Partnership Project; Technical Specification Group Services and System Aspects; General Packet Radio Service (GPRS) enhancements for Evolved Universal Terrestrial Radio Access Network (E-UTRAN) access (Release 13)," 3GPP, 650 Route des Lucioles—Sophia Antipolls Valbonne—France, Dec. 2015, 337 pages.

Author Unknown, "3GPP TS 23.401 V9.5.0 (Jun. 2010) Technical Specification: Group Services and Systems Aspects; General Packet Radio Service (GPRS) Enhancements for Evolved Universal Terrestrial Radio Access Network (E-UTRAN) Access (Release 9)," 3rd Generation Partnership Project (3GPP), 650 Route des Lucioles—Sophia Antipolis Valbonne—France, Jun. 2010; 259 pages.

Author Unknown, "3GPP TS 29.212 V13.1.0 (Mar. 2015) Technical Specification: 3rd Generation Partnership Project; Technical Specification Group Core Network and Terminals; Policy and Charging Control (PCC); Reference points (Release 13)," 3rd Generation Partnership Project (3GPP), 650 Route des Lucioles—Sophia Antipolis Valbonne—France, Mar. 2015; 230 pages.

Author Unknown, "Service-Aware Network Architecture Based on SDN, NFV, and Network Intelligence," 2014, 8 pages.

Baird, Andrew, et al. "AWS Serverless Multi-Tier Architectures; Using Amazon API Gateway and AWS Lambda," Amazon Web Services Inc., Nov. 2015, 20 pages.

Bi, Jing, et al., "Dynamic Provisioning Modeling for Virtualized Multi-tier Applications in Cloud Data Center," 2010 IEEE $3^{rd}$ International Conference on Cloud Computing, Jul. 5, 2010, pp. 370-377, IEEE Computer Society.

Bitar, N., et al., "Interface to the Routing System (I2RS) for the Service Chaining: Use Cases and Requirements," draft-bitar-i2rs-service-chaining-01, Feb. 14, 2014, pp. 1-15.

Boucadair, Mohamed, et al., "Differentiated Service Function Chaining Framework," Network Working Group Internet Draft draft-boucadair-network-function-chaining-03, Aug. 21, 2013, 21 pages.

Bremler-Barr, Anat, et al., "Deep Packet Inspection as a Service," CoNEXT '14, Dec. 2-5, 2014, pp. 271-282.

Cisco Systems, Inc. "Cisco NSH Service Chaining Configuration Guide," Jul. 28, 2017, 11 pages.

Cisco Systems, Inc. "Cisco VN-LINK: Virtualization-Aware Networking," 2009, 9 pages.

Dunbar, et al., "Architecture for Chaining Legacy Layer 4-7 Service Functions," IETF Network Working Group Internet Draft, draft-dunbar-sfc-legacy-14-17-chain-architecture-03.txt, Feb. 10, 2014; 17 pages.

Ersue, Mehmet, "ETSI NFV Management and Orchestration—An Overview," Presentation at the IETF# 88 Meeting, Nov. 3, 2013, 14 pages.

Farrel, A., et al., "A Path Computation Element (PCE)—Based Architecture," RFC 4655, Network Working Group, Aug. 2006, 40 pages.

Fayaz, Seyed K., et al., "Efficient Network Reachability Analysis using a Succinct Control Plane Representation," 2016, ratul.org, pp. 1-16.

Halpern, Joel, et al., "Service Function Chaining (SFC) Architecture," Internet Engineering Task Force (IETF), Cisco, Oct. 2015, 32 pages.

Hendrickson, Scott, et al. "Serverless Computation with OpenLambda," Elastic 60, University of Wisconsin, Madison, Jun. 20, 2016, 7 pages, https://www.usenix.org/system/files/conference/hotcloud16/hotcloud16_hendrickson.pdf.

Jiang, Y., et al., "An Architecture of Service Function Chaining," IETF Network Working Group Internet Draft, draft-jiang-sfc-arch-01.txt, Feb. 14, 2014; 12 pages.

Jiang, Yuanlong, et al., "Fault Management in Service Function Chaining," Network Working Group, China Telecom, Oct. 16, 2015, 13 pages.

Katsikas, Goergios P., et al., "Profiling and accelerating commodity NFV service chains with SCC," The Journal of Systems and Software, vol. 127, Jan. 2017, pp. 12-27.

Kumar, Surendra, et al., "Service Function Path Optimization: draft-kumar-sfc-sfp-optimization-00.txt," Internet Engineering Task Force, IETF; Standard Working Draft, May 10, 2014, 14 pages.

Kumbhare, Abhijit, et al., "Opendaylight Service Function Chaining Use-Cases," Oct. 14, 2014, 25 pages.

Li, Hongyu, "Service Function Chaining Use Cases", IETF 88 Vancouver, Nov. 7, 2013, 7 pages.

Mortensen, A., et al., "Distributed Denial of Service (DDoS) Open Threat Signaling Requirements," DOTS, Mar. 18, 2016, 16 pages; https://tools.ietf.org/pdf/draft-ietf-dots-requirements-01.pdf.

Newman, David, "Review: FireEye fights off multi-stage malware," Network World, May 5, 2014, 7 pages.

Nguyen, Kim-Khoa, et al. "Distributed Control Plane Architecture of Next Generation IP Routers," IEEE, 2009, 8 pages.

Penno, Reinaldo, et al. "Packet Generation in Service Function Chains," draft-penno-sfc-packet-03, Apr. 29, 2016, 25 pages.

Penno, Reinaldo, et al. "Services Function Chaining Traceroute," draft-penno-sfc-trace-03, Sep. 30, 2015, 9 pages.

Pierre-Louis, Marc-Arhtur, "OpenWhisk: A quick tech preview," DeveloperWorks Open, IBM, Feb. 22, 2016, modified Mar. 3, 2016, 7 pages; https://developer.ibm.com/open/2016/02/22/openwhisk-a-quick-tech-preview/.

Pujol, Pua Capdevila, "Deployment of NFV and SFC scenarios," EETAC, Master Thesis, Advisor: David Rincon Rivera, Universitat Politecnica De Catalunya, Feb. 17, 2017, 115 pages.

Quinn, P., et al., "Network Service Header," Network Working Group, Mar. 24, 2015, 42 pages; https://tools.ietf.org/pdf/draft-ietf-sfc-nsh-00.pdf.

Quinn, P., et al., "Network Service Chaining Problem Statement," draft-quinn-nsc-problem-statement-03.txt, Aug. 26, 2013, 18 pages.

Quinn, Paul, et al., "Network Service Header," Network Working Group, draft-quinn-sfc-nsh-02.txt, Feb. 14, 2014, 21 pages.

Quinn, Paul, et al., "Network Service Header," Network Working Group, draft-quinn-nsh-00.txt, Jun. 13, 2013, 20 pages.

Quinn, Paul, et al., "Network Service Header," Network Working Group Internet Draft draft-quinn-nsh-01, Jul. 12, 2013, 20 pages.

Quinn, Paul, et al., "Service Function Chaining (SFC) Architecture," Network Working Group Internet Draft draft-quinn-sfc-arch-05.txt, May 5, 2014, 31 pages.

Quinn, Paul, et al., "Service Function Chaining: Creating a Service Plane via Network Service Headers," IEEE Computer Society, 2014, pp. 38-44.

Wong, Fei, et al., "SMPTE-TT Embedded in ID3 for HTTP Live Streaming, draft-smpte-id3-http-live-streaming-00," Informational Internet Draft, Jun. 2012, 7 pages http://tools.ietf.org/htnnl/draft-snnpte-id3-http-live-streaming-00.

Yadav, Rishi, "What Real Cloud-Native Apps Will Look Like," Crunch Network, posted Aug. 3, 2016, 8 pages; https://techcrunch.com/2016/08/03/what-real-cloud-native-apps-will-look-like/.

Zhang, Ying, et al. "StEERING: A Software-Defined Networking for Inline Service Chaining," IEEE, 2013, IEEE, p. 10 pages.

* cited by examiner

SYSTEM AND METHOD FOR OBTAINING MICRO-SERVICE TELEMETRY DATA

CROSS-REFERENCE TO RELATED APPLICATION

This application is a continuation of U.S. patent application Ser. No. 15/793,557 filed Oct. 25, 2017, which issued as U.S. Pat. No. 10,541,893, on Jan. 21, 2020, the contents of which is incorporated herein by reference in its entirety.

TECHNICAL FIELD

The present technology pertains to the use of an overlay network termination endpoint as a proxy to collect telemetry data for micro-services or specific applications provided by containers in overlay data centers.

BACKGROUND

Network Operators use various overlay techniques to collect micro-service or application specific telemetry data such as packet-in, packet-out, etc. For each overlay technique, there are different Operation, Administration and Management (OAM) functionalities available. For example, in a service chaining (SFC) environment, a container can be viewed as service function connected through a service function forwarder. Similarly, in a data center environment, a container can be considered as an end point (application) that is connected through a network virtualization edge (NVE) or other virtual tunnel end point (VTEP). Relevant OAM protocols (e.g., a Unified Overlay OAM protocol extension) can be used to query the telemetry data.

However, the existing OAM techniques require a traffic probe (a probe to collect the telemetry data) to flow over the underlying, container to obtain the local statistics. This requires the containers to have the capability to understand the OAM functionality in order to work properly.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DESCRIPTION OF EXAMPLE EMBODIMENTS

Figure 1A:
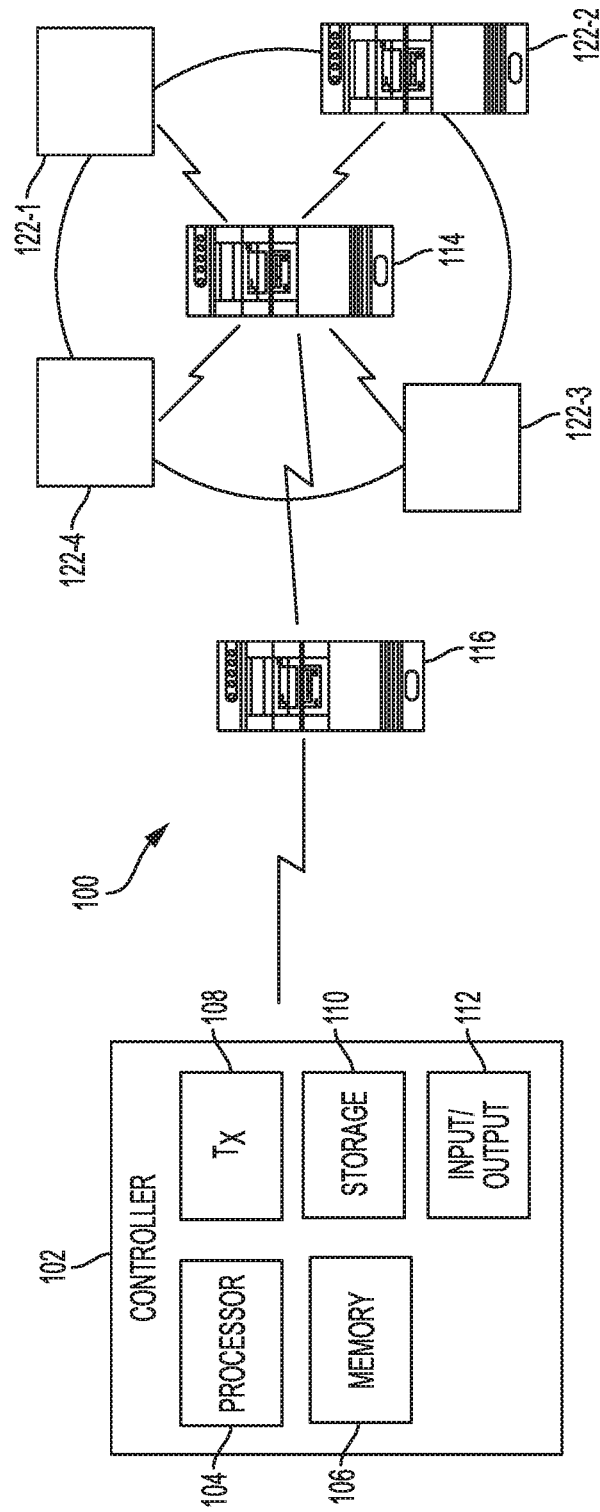
FIGS. 1A-D illustrate example network environments and architectures, according to one aspect of the present disclosure.

Various examples of the disclosure are discussed in detail below. While specific implementations are discussed, it should be understood that this is done for illustration purposes only. A person skilled in the relevant art will recognize that other components and configurations may be used without parting from the spirit and scope of the disclosure.

References to one or an example embodiment in the present disclosure can be, but not necessarily are references to the same example embodiment; and, such references mean at least one of the example embodiments.

Reference to "one example embodiment" or "an example embodiment" means that a particular feature, structure, or characteristic described in connection with the example embodiment is included in at least one example of the disclosure. The appearances of the phrase "in one example embodiment" in various places in the specification are not necessarily all referring to the same example embodiment, nor are separate or alternative example embodiments mutually exclusive of other example embodiments. Moreover, various features are described which may be exhibited by some example embodiments and not by others. Similarly, various features are described which may be features for some example embodiments but not other example embodiments.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various examples given in this specification.

Without intent to limit the scope of the disclosure, examples of instruments, apparatus, methods and their related results according to examples of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Although the terms first, second, etc. may be used herein to describe various elements, these elements should not be limited by these terms. These terms are only used to distinguish one element from another. For example, a first element could be termed a second element, and similarly, a second element could be termed a first element, without departing from the scope of this disclosure. As used herein, the term "and/or," includes any and all combinations of one or more of the associated listed items.

When an element is referred to as being connected," or coupled," to another element, it can be directly connected or coupled to the other element or intervening elements may be present. By contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular examples only and is not intended to be limiting. As used herein, the singular forms "a" "an", and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Specific details are provided in the following description to provide a thorough understanding of examples. However, it will be understood by one of ordinary skill in the art that examples may be practiced without these specific details. For example, systems may be shown in block diagrams so as not to obscure the examples in unnecessary detail. In other instances, well-known processes, structures and techniques may be shown without unnecessary detail in order to avoid obscuring examples.

In the following description, illustrative examples will be described with reference to acts and symbolic representations of operations (e.g., in the form of flow charts, flow diagrams, data flow diagrams, structure diagrams, bloc diagrams, etc.) that may be implemented as program services or functional processes include routines, programs, objects, components, data structures, etc., that perform particular tasks or implement particular abstract data types and may be implemented using hardware at network elements. Non-limiting examples of such hardware may include one or more Central Processing Units (CPUs), digital signal processors (DSPs), application-specific-integrated-circuits, field programmable gate arrays (FPGAs), computers or the like.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Overview

In one aspect of the present disclosure, a method includes receiving, at a controller, a probe for flow statistics associated with a service path, the probe including corresponding flow identification information, extracting the corresponding flow identification information from the probe, obtaining the flow statistics from an agent based on the flow identification information, the agent being configured to manage a plurality of containers, generating a response packet including the flow statistics obtained from the agent and sending the response packet to an initiator from which the query is received.

In one aspect of the present disclosure, a system includes memory configured to store computer-readable instructions and one or more processors configured to execute the computer-readable instructions to perform the functions of receiving a probe for flow statistics associated with a service path, the probe including corresponding flow identification information, extracting the corresponding flow identification information from the probe, obtaining the flow statistics from an agent based on the flow identification information, the agent being configured to manage a plurality of containers, generating a response packet including the flow statistics obtained from the agent; and sending the response packet to an initiator from which the query is received.

In one aspect of the present disclosure, one or more non-transitory computer-readable medium have computer-readable instructions stored therein, which when executed by one or more processors, cause the one or more processors to perform the functions of receiving a probe for flow statistics associated with a service path, the probe including corresponding flow identification information, extracting the corresponding flow identification information from the probe, obtaining the flow statistics from an agent based on the flow identification information, the agent being configured to manage a plurality of containers, generating a response packet including the flow statistics obtained from the agent and sending the response packet to an initiator from which the query is received.

Description

The disclosed technology is directed to the use of an overlay termination endpoint as a proxy such that upon receiving an OAM probe, the proxy obtains flow identification information from the probe to determine a service path to a destination container via a corresponding virtual port that services data (a service function path) and sends queries for statistics/telemetry data on the service function path. The proxy, upon receiving the telemetry data, includes the same in a response to be sent back to an entity (initiator) from which the OAM probe was originally received.

Examples of the present disclosure leverage the use of Contiv HostAgents to collect the requested telemetry data/statistics such that an OAM packet (OAM probe) would no longer have to travel over containers and containers would no longer have to learn, understand and process the OAM functionality.

The disclosure begins with a description of example network environments and architectures, as illustrated in FIGS. 1A-D.

FIG. 1A illustrates an example system, according to one aspect of the present disclosure. System 100 of FIG. 1A includes a controller 102 and a distributed streaming system 120. Controller 102 can be an application, a software container, a virtual machine, a service chain, a virtual function(s), etc. Controller 102 can run on one or more devices or servers having components such as one or more processors (e.g, processor 104), one or more memories (e.g., memory 106), a transceiver 108, a display device 110 and an input device 112. Processor 104 can be configured to execute computer-readable instructions stored on memory 106 for performing the functionalities which will be described below with reference to FIGS. 4-6. Throughout the disclosure, controller 102 can be referred to as system management component 102, management device 102, device 102 and/or system controller 102.

Transceiver 108 can be any known or to be developed receiver and transmitter through which controller 102 can send and receive information to and from external components such as components of distributed streaming system 120.

Network operators and controllers (operational management component) can use display 110 to view data corresponding to status and/or management of operation of distributed streaming system 120, as will be described below. Display 110 can be any type of know or to be developed display such as a liquid crystal display (LCD), a light emitting diode display (LED), etc.

Input device 112 can be any known or to be developed input device including, but not limited to, a keyboard, a touch-based input device, etc. In one example, display 110 and input device 112 can be the same when display 110 is a touch enabled device capable of receiving inputs. Network managers and operators can provide appropriate commands for monitoring and management of distributed streaming system 120, via input device 112.

Controller 102 can communicate with various components of distributed streaming system 120 via any known or to be developed wireless communications and/or wired communications mean. For example, controller 102 can access and obtain information (and/or send information) to each component of distributed system 120 via a network such as a local area wireless network (LAN), a virtual local area network (vLAN) and/or any other type of, known or to be developed, network through which controller 102 can communicate with each component of distributed streaming system 120.

In one aspect, controller 102 can be any known or to be developed electronic device including, but not limited to, a laptop, a desktop computer, a mobile device, a handheld device, etc.

Distributed streaming system 120 can be any known, or to be developed, distributed streaming system where various components thereof such as components 122-1, 122-2, 122-3 and 122-4 communicate with one another to provide a streaming service to users in a distributed fashion. Hereinafter, components 122-1, 122-2, 122-3 and 122-4 may simply be referred to as components 122 or nodes 122. While throughout the present disclosure, distributed streaming system is provided as an example, the present disclosure is not limited thereto and can encompass and be applicable to any distributed systems that can be abstracted into a Directed Acyclic Graph (DAG) where each vertex can denote an information/message, and information/messages are passed through edges in certain directions. Other examples of distributed systems include a distributed sensor network where signals are propagated from sensor to sensor, a multi-component data processing system where each component receives and processes chunks of data and pass it to the next component(s).

Each one of components 122 can be any know or to be developed electronic device capable of communicating remotely with other devices such as other components 122. For example, each component 122 can be a mobile device, a laptop, a desktop computer, a switch, a data center comprising one or more servers, etc. For example, while some of components 122 can be end user devices or hosts, other ones of components 122 can be servers that facilitate the streaming services provided by distributed streaming system 120.

Furthermore, distributed streaming system 120 can have a server 114 acting as a collector of information (data) for other components (end user devices) in the system. Examples of data include device metrics such as device ID, an associated timestamp, device IP address, device throughput, device latency, memory and processing speed characteristics, etc.

In one example, system 100 further includes one or more feedback servers 116, where various types of data (to be used by controller 102) on components 122 can be collected and saved. In another example, system 100 does not include any feedback servers and instead can directly receive (through push or pull operations) the intended data (which will be described below) from each component 122.

Distributed streaming system 120 can be a cloud based system, where each component thereof is located in a different geographical location but can communicate with one another to form distributed streaming system 120 (e.g., over the Internet).

Examples of streaming services provided via distributed streaming system 120 can include, but is not limited to, live video and/or audio content such as a speech, a concert, a TV program, music, etc.

Operations of distributed streaming system 120 for delivering a streaming service to end users can be based on any know or to be developed method for doing so, by for example, continuously processing a stream of text, graphs, videos, audios, time series data, etc. in real time or near real time or periodically. The system 100 of FIG. 1A utilizes client/server based architectures. In other examples, system 100 can be implemented as a cloud or fog computing architecture.

Figure 1B:
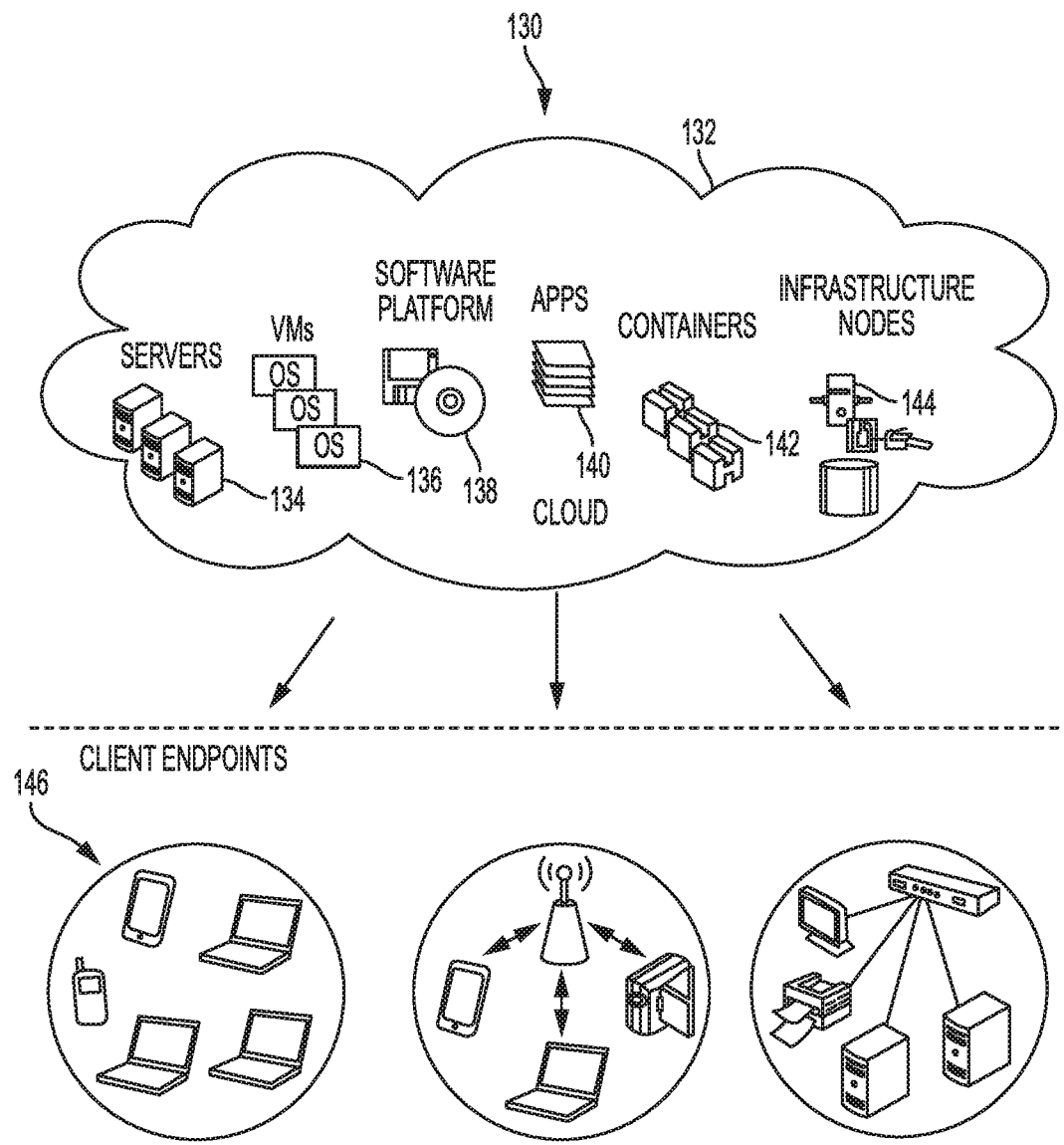

FIG. 1B illustrates a diagram of an example cloud computing architecture 130. The architecture can include a cloud 132. The cloud 132 can include one or more private clouds, public clouds, and/or hybrid clouds. Moreover, the cloud 132 can include cloud elements 134-144. The cloud elements 134-144 can include, for example, servers 134, virtual machines (VMs) 136, one or more software platforms 138, applications or services 140, software containers 142, and infrastructure nodes 144. The infrastructure nodes 144 can include various types of nodes, such as compute nodes, storage nodes, network nodes, management systems, etc. In one example, one or more servers 134 can implement the functionalities of controller 102, which will be described below. Alternatively, controller 102 can be a separate component that communicates with components of the cloud computing architecture 130 that function as a distributed streaming system similar to the distributed streamlining system 120.

The cloud 132 can provide various cloud computing services via the cloud elements 134-144, such as software as a service (SaaS) (e.g., collaboration services, email services, enterprise resource planning services, content services, communication services, etc.), infrastructure as a service (IaaS) (e.g, security services, networking services, systems management services, etc.), platform as a service (PaaS) (e.g., web services, streaming services, application development services, etc.), function as a service (FaaS), and other types of services such as desktop as a service (DaaS), information technology management as a service (ITaaS), managed software as a service (MSaaS), mobile backend as a service (MBaaS), etc.

The client endpoints 146 can connect with the cloud 132 to obtain one or more specific services from the cloud 132. The client endpoints 146 can communicate with elements 134-144 via one or more public networks (e.g., Internet), private networks, and/or hybrid networks (e.g., virtual private network). The client endpoints 146 can include any device with networking capabilities, such as a laptop computer, a tablet computer, a server, a desktop computer, a smartphone, a network device (e.g, an access point, a router, a switch, etc.), a smart television, a smart car, a sensor, a GPS device, a game system, a smart wearable object (e.g., smartwatch, etc.), a consumer object (e.g., Internet refrigerator, smart lighting system, etc.), a city or transportation system (e.g., traffic control, toll collection system, etc.), an internet of things (IoT) device, a camera, a network printer, a transportation system (e.g., airplane, train, motorcycle, boat, etc.), or any smart or connected object (e.g., smart home, smart building, smart retail, smart glasses, etc.), and so forth.

Figure 1C:
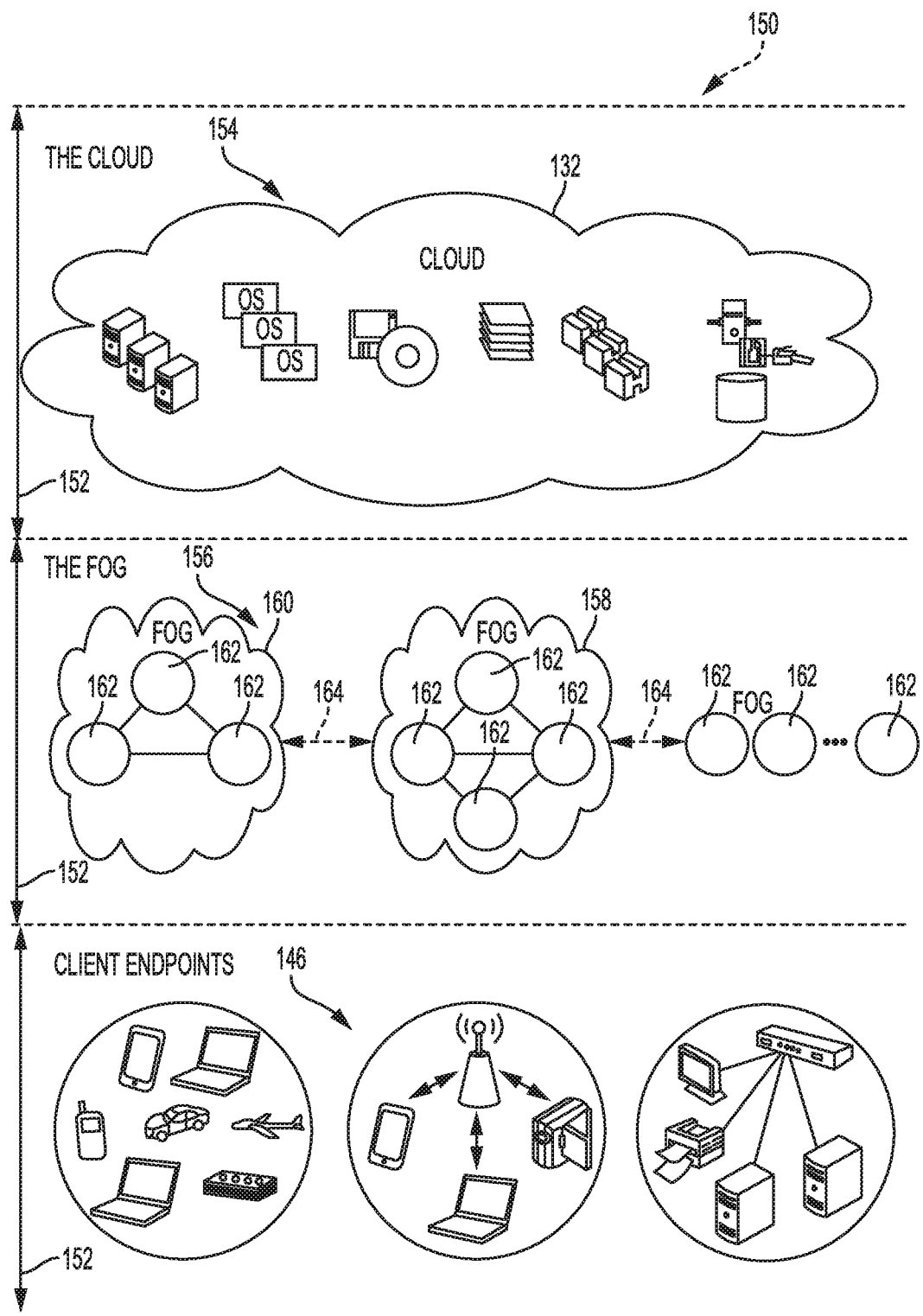

FIG. 1C illustrates a diagram of an example fog computing architecture 150. The fog computing architecture 150 can include the cloud layer 154, which include the cloud 132 and any other cloud system or environment, and the fog layer 156, which includes fog nodes 162. The client endpoints 146 can communicate with the cloud layer 154 and/or the fog layer 156. The architecture 150 can include one or more communication links 152 between the cloud layer 154, the fog layer 156, and the client endpoints 146. Communications can flow up to the cloud layer 154 and/or down to the client endpoints 146.

In one example, one or more servers 134 can implement the functionalities of controller 102, which will be described below. Alternatively, controller 102 can be a separate component that communicates with components of the fog computing architecture 150 that function as a distributed streaming system similar to the distributed streamlining system 120.

The fog layer 156 or "the fog" provides the computation, storage and networking capabilities of traditional cloud networks, but closer to the endpoints. The fog can thus extend the cloud 132 to be closer to the client endpoints 146. The fog nodes 162 can be the physical implementation of fog networks. Moreover, the fog nodes 162 can provide local or regional services and/or connectivity to the client endpoints 146. As a result, traffic and/or data can be offloaded from the cloud 132 to the fog layer 156 (e.g., via fog nodes 162). The fog layer 156 can thus provide faster services and/or connectivity to the client endpoints 146, with lower latency, as well as other advantages such as security benefits from keeping the data inside the local or regional network(s).

The fog nodes 162 can include any networked computing devices, such as servers, switches, routers, controllers, cameras, access points, kiosks, gateways, etc. Moreover, the fog nodes 162 can be deployed anywhere with a network connection, such as a factory floor, a power pole, alongside a railway track, in a vehicle, on an oil rig, in an airport, on an aircraft, in a shopping center, in a hospital, in a park, in a parking garage, in a library, etc.

In some configurations, one or more fog nodes 162 can be deployed within fog instances 158, 160. The fog instances 158, 158 can be local or regional clouds or networks. For example, the fog instances 156, 158 can be a regional cloud or data center, a local area network, a network of fog nodes 162, etc. In some configurations, one or more fog nodes 162 can be deployed within a network, or as standalone or individual nodes, for example. Moreover, one or more of the fog nodes 162 can be interconnected with each other via links 164 in various topologies, including star ring, mesh or hierarchical arrangements, for example.

In some cases one or more fog nodes 162 can be mobile fog nodes. The mobile fog nodes can move to different geographic locations, logical locations or networks, and/or fog instances While maintaining connectivity with the cloud layer 154 and/or the endpoints 146. For example, a particular fog node can be placed in a vehicle, such as an aircraft or train, which can travel from one geographic location and/or logical location to a different geographic location and/or logical location. In this example, the particular fog node may connect to a particular physical and/or logical connection point with the cloud 154 while located at the starting location and switch to a different physical and/or logical connection point with the cloud 154 while located at the destination location. The particular fog node can thus move within particular clouds and/or fog instances and, therefore serve endpoints from different locations at different times.

Figure 1D:
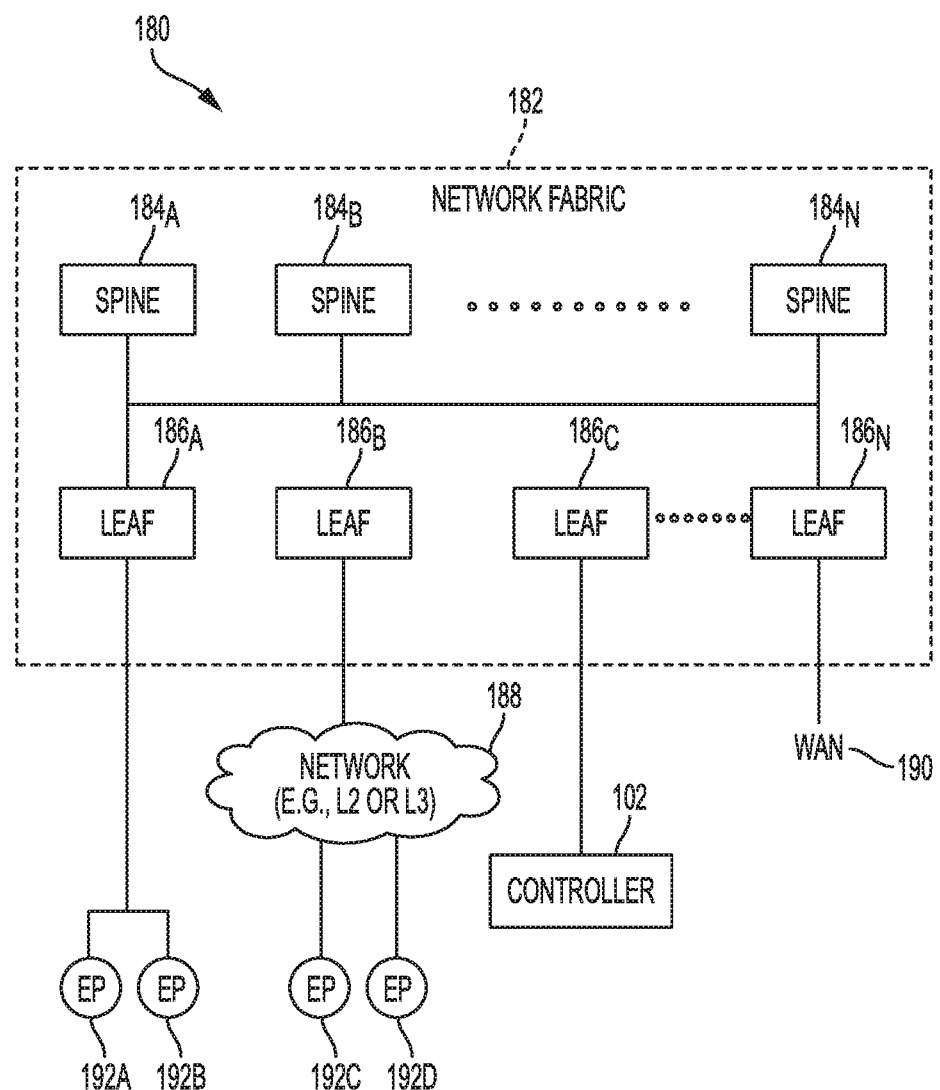

FIG. 1D illustrates a schematic block diagram of an example network architecture 180. In some cases, the architecture 180 can include a data center, which can support and/or host the cloud 132. Moreover, the architecture 180 includes a network fabric 182 with spines 184A, 184B, . . . , 184N (collectively "184") connected to leafs 186A, 186B, 186C, . . . , 186N (collectively "186") in the network fabric 182. Spines 184 and leafs 186 can be Layer 2 and/or Layer 3 devices, such as switches or routers. For the sake of clarity, they will be referenced herein as spine switches 184 and leaf switches 186.

Spine switches 184 connect to leaf switches 186 in the fabric 182. Leaf switches 186 can include access ports (or non-fabric ports) and fabric ports. Fabric ports can provide uplinks to the spine switches 182, while access ports can provide connectivity for devices, hosts, endpoints, VMs, or external networks to the fabric 182.

Leaf switches 186 can reside at the boundary between the fabric 182 and the tenant or customer space. The leaf switches 186 can route and/or bridge the tenant packets and apply network policies. In some cases, a leaf switch can perform one or more additional functions such as implementing a mapping cache, sending packets to the proxy function when there is a miss in the cache, encapsulate packets, enforce ingress or egress policies, etc.

Moreover, the leaf switches 186 can contain virtual switching and/or tunneling functionalities, such as a virtual tunnel endpoint (VTEP) function. Thus, leaf switches 186 can connect the fabric 182 to an overlay (e.g., VXLAN network).

Network connectivity in the fabric 182 can flow through the leaf switches 186. The leaf switches 186 can provide servers, resources, endpoints, external networks, containers, or VMs access to the fabric 182, and can connect the leaf switches 186 to each other. The leaf switches 186 can connect applications and/or endpoint groups ("EPGs") to other resources inside or outside of the fabric 182 as well as any external networks.

Endpoints 192A-D (collectively "192") can connect to the fabric 182 via leaf switches 186. For example, endpoints 192A and 192B can connect directly to leaf switch 186A, which can connect endpoints 192A and 192B to the fabric 182 and/or any other of the leaf switches 186. Similarly, controller 102 (Which can be the same as controller 102 described above with reference to FIG. 1A) can connect directly to leaf switch 186C, which can connect controller 102 to the fabric 182 and/or any other of the leaf switches 186. On the other hand, endpoints 192C and 192D can connect to leaf switch 186A and 186B via network 188. Moreover, the wide area network (WAN) 190 can connect to the leaf switches 186N.

Endpoints 192 can include any communication device or resource, such as a computer, a server, a cluster, a switch, a container, a VM, a virtual application, etc. In some cases, the endpoints 192 can include a server or switch configured with a virtual tunnel endpoint functionality which connects an overlay network with the fabric 182. For example, in some cases, the endpoints 192 can represent hosts (e.g., servers) with virtual tunnel endpoint capabilities, and running virtual environments (e.g., hypervisor, virtual machine(s), containers, etc.). An overlay network associated with the endpoints 192 can host physical devices, such as servers; applications; EPGs; virtual segments; virtual workloads; etc. Likewise, endpoints 192 can also host virtual workloads and applications, which can connect with the fabric 182 or any other device or network, including an external network.

Figure 2:
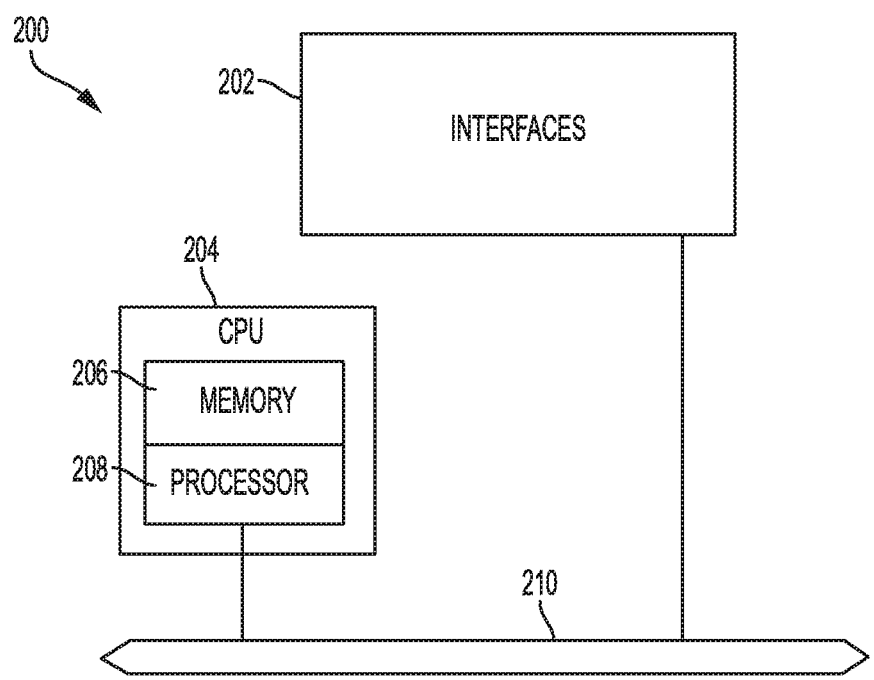
FIG. 2 illustrates an example network device suitable for performing switching, routing, load balancing, and other networking operations, according to an aspect of the present disclosure.
Figure 3:
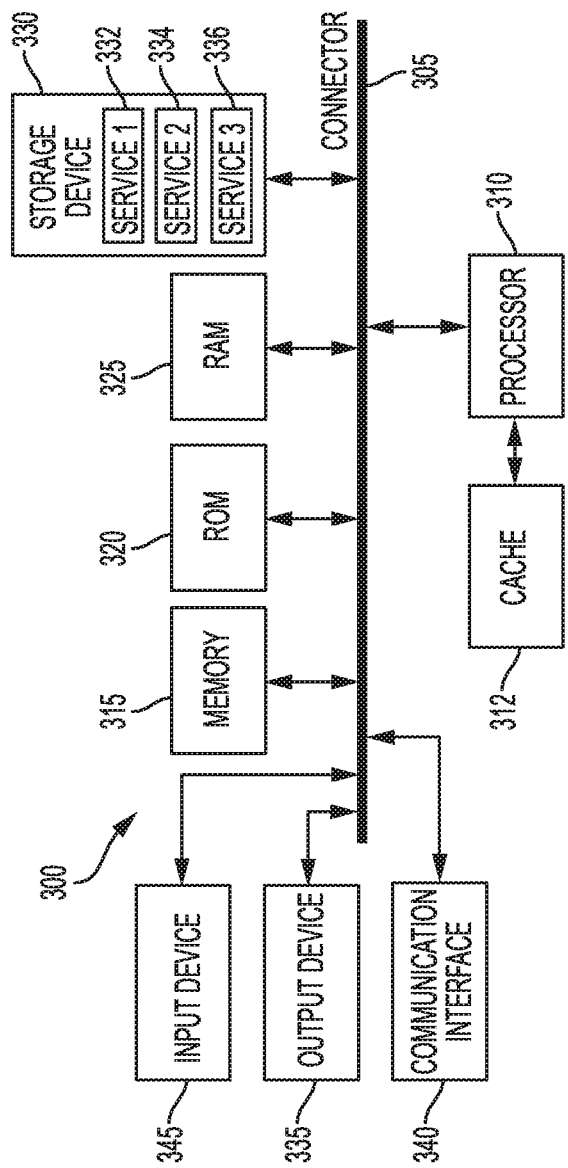
FIG. 3 illustrates a computing system architecture, according to an aspect of the present disclosure.

The disclosure now turns to FIGS. 2 and 3, which illustrate example network devices and computing devices, such as switches, routers, load balancers, client devices, and so forth.

FIG. 2 illustrates an example network device suitable for performing switching, routing, load balancing, and other networking operations, according to an aspect of the present disclosure. In one example, network device 200 can be controller 102 and/or any one of components 122 of FIG. 1A. Network device 200 includes a central processing unit (CPU) 204, interfaces 202, and a bus 210 (e.g., a PCI bus). When acting under the control of appropriate software or firmware, CPU 204 is responsible for executing packet management, error detection, and/or routing functions. CPU 204 preferably accomplishes all these functions under the control of software including an operating system and any appropriate applications software. CPU 204 may include one or more processors 208, such as a processor from the INTEL X86 family of microprocessors. In some cases, processor 208 can be specially designed hardware for controlling the operations of network device 200. In some cases, a memory 206 (e.g., non-volatile RAM, ROM, etc.) also forms part of CPU 204. However, there are many different ways in which memory could be coupled to the system.

Interfaces 202 are typically provided as modular interface cards (sometimes referred to as "line cards"). Generally, they control the sending and receiving of data packets over the network and sometimes support other peripherals used with network device 200. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces, WIFI interfaces, 3G/4G/5G cellular interfaces, CAN BUS, LoRA, and the like. Generally, these interfaces may include ports appropriate for communication with the appropriate media. In some cases, they may also include an independent processor and, in some instances, volatile RAM. The independent processors may control such communications intensive tasks as packet switching, media control, signal processing, crypto processing, and management. By providing separate processors for the communications intensive tasks, these interfaces allow the master microprocessor 204 to efficiently perform routing computations, network diagnostics, security functions, etc.

Although the system shown in FIG. 2 is one specific network device of the present invention, it is by no means the only network device architecture on which the present invention can be implemented. For example, an architecture having a single processor that handles communications as well as routing computations, etc., is often used. Further, other types of interfaces and media could also be used with network device 200.

Regardless of the network device's configuration, it may employ one or more memories or memory modules (including memory 206) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc. Memory 206 could also hold various software containers and virtualized execution environments and data.

Network device 200 can also include an application-specific integrated circuit (ASIC), which can be configured to perform routing and/or switching operations. The ASIC can communicate with other components in network device 200 via bus 210, to exchange data and signals and coordinate various types of operations by network device 200, such as routing, switching, and/or data storage operations, for example.

FIG. 3 illustrates a computing system architecture, according to an aspect of the present disclosure. As shown in FIG. 3, components of system 300 are in electrical communication with each other using a connection 305, such as a bus. Exemplary system 300 includes a processing unit (CPU or processor) 310 and a system connection 305 that couples various system components including system memory 315, such as read only memory (ROM) 320 and random access memory (RAM) 325, to processor 710. System 300 can include a cache of high-speed memory connected directly with, in close proximity to, or integrated as part of the processor 310. System 300 can copy data from memory 315 and/or storage device 330 to cache 312 for quick access by processor 310. In this way, the cache can provide a performance boost that avoids processor 310 delays while waiting for data. These and other modules can control or be configured to control the processor 310 to perform various actions. Other system memory 315 may be available for use as well. Memory 315 can include multiple different types of memory with different performance characteristics. Processor 310 can include any general purpose processor and a hardware or software service, such as Service 1 332, Service 2 334, and Service 3 336 stored in storage device 330, configured to control processor 310 as well as a special-purpose processor where software instructions are incorporated into the actual processor design. Processor 310 may be a completely self-contained computing system, containing multiple cores or processors, a bus, memory controller, cache, etc. A multi-core processor may be symmetric or asymmetric.

To enable user interaction with the computing device 300, an input device 345 can represent any number of input mechanisms, such as a microphone for speech, a touch-sensitive screen for gesture or graphical input, keyboard, mouse, motion input, speech and so forth. An output device 335 can also be one or more of a number of output mechanisms known to those of skill in the art. In some instances, multimodal systems can enable a user to provide multiple types of input to communicate with computing device 300. The communications interface 340 can generally govern and manage the user input and system output.

There is no restriction on operating on any particular hardware arrangement and therefore the basic features here may easily be substituted for improved hardware or firmware arrangements as they are developed.

Storage device 330 is a non-volatile memory and can be a hard disk or other types of computer readable media which can store data that are accessible by a computer, such as magnetic cassettes, flash memory cards, solid state memory devices, digital versatile disks, cartridges, random access memories (RAMS) 325, read only memory (ROM) 320, and hybrids thereof.

The storage device 330 can include services 332, 334, 336 for controlling the processor 310. Other hardware or software modules are contemplated. The storage device 330 can be connected to the system connection 305. In one aspect, a hardware module that performs a particular function can include the software component stored in a computer-readable medium in connection with the necessary hardware components, such as the processor 310, connection 305, output device 335, and so forth, to carry out the function.

Figure 4:
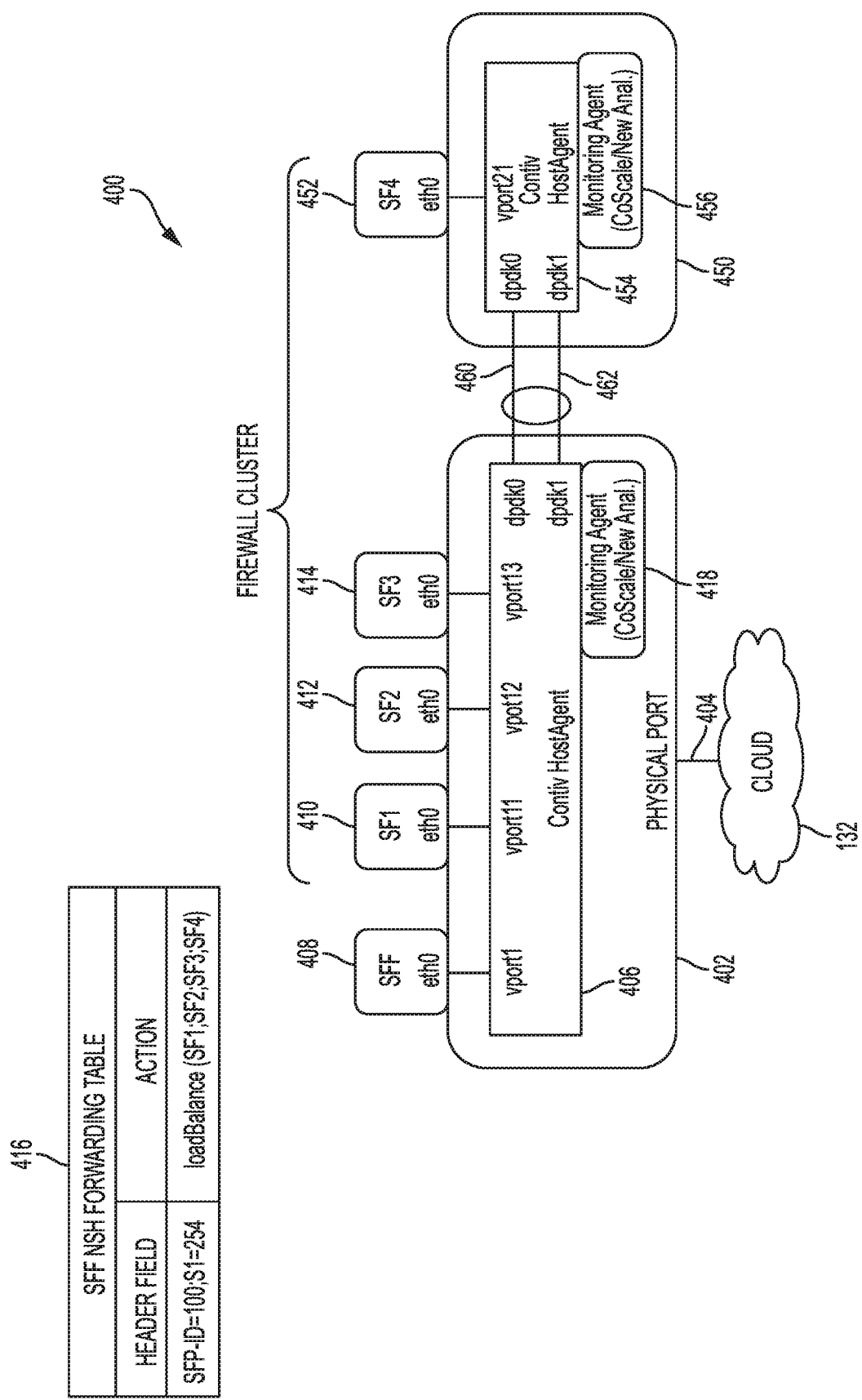
FIG. 4 illustrates an example system of service function chaining environment, according to an aspect of the present disclosure.

FIG. 4 illustrates an example system of service function chaining environment, according to an aspect of the present disclosure.

According to FIG. 4, a system 400 includes a physical host 402 (which can be any one of servers 134, VMs 136, Software platforms 138, Applications 140, containers 142 and/or infrastructure nodes 144 shown in FIG. 1B) and a physical host 450 (which can be any one of servers 134, VMs 136, Software platforms 138, Applications 140, containers 142 and/or infrastructure nodes 144 shown in FIG. 1B). While FIG. 4 illustrates two physical hosts, the number of physical hosts of system 400 can be more or less. System 400 can include only physical host 402 or more than two physical hosts 402 and 450 shown in FIG. 4.

Physical host 402 has a physical port 404 through which real time network traffic (e.g., data packets, OAM probes, etc.) arrive at the physical host 402, via cloud 132, to be processed, Physical host 402 can have Contiv HostAgent 406. Contiv HostAgent 406 (hereinafter Contiv 404 or agent 404) is implemented via one or more processors of physical host 402 for delivering/deploying and managing microservices on physical host 402. As is known, Contiv 406 is a network abstraction layer for microservices, with examples of microservices being service functions (SF) (which can also be referred to as Containers) 408, 410, 412 and 414.

Contiv 406, as shown in FIG. 4, can have one or more virtual input/output ports to and from containers 408-414, such as vport1 to container 408, vport11 to container 410, vport12 to container 412. vport13 to container 414. Each of containers 408-414 can have an associated virtual port (eth0) for exchange of network traffic (data packets) with Contiv 406 via corresponding vport of Contiv 404. In one non-limiting example of containers 408-414, as shown in FIG. 4, container 408 is a service function forwarder (SFF) that implements policies for forwarding/load balancing network traffic between containers that provide a particular service function. Hereinafter, container 408 is used as an example of a proxy for obtaining path specific telemetry data and can also be referred to as a controller.

In one example, container 408 can have table 416 associated therewith, which can also be referred to as a SFF network service header forwarding table. In one example, upon receiving a data packet, container 408 compares information included in a network service header (NSH) of the received packet/probe to information available in table 416 (e.g., information provided under the Header Field column in Table 416 and the corresponding information under the Action column in Table 416) identify containers amongst which received data packets are to be load balanced. An example of information under the Header Field column, shown in FIG. 4, is "SFP.ID100;SI=254", "SFP.ID" can be a service function path ID (service path ID) that indicates which service function (container) is the frame to be steered to while "SI" can a service index that specifies the hop(s) within a service function path. Furthermore, information under the Action column can identify the next hope, which in the example table 416 can be load balancing between service functions (containers 410, 412, 414 and 452).

As mentioned above, system 400 also includes physical host 450 having a corresponding container 452 and a corresponding Contiv HostAgent 454. Operation of Contiv HostAgent 454 (which can hereinafter be referred to as Contiv 454) is the same as Contiv 406 described above. In one example, containers 410-414 and container 452 together form a cluster of containers that provide a specific type of function (e.g., a firewall service, thus making the cluster of containers 410-414 and 452 a firewall cluster, as shown in FIG. 4).

Each of physical hosts 402 and 450 have corresponding ports (dpdk0, dpdk1), through which information and data packets are exchanged between physical hosts 402 and 450. Physical hosts 402 and 450 may be connected via any known or to be developed wired and/or wireless links 460 and 462, as shown in FIG. 4.

Contiv 404 also has a monitoring agent 418 (examples of which are Coscale agent, New Relic agent, etc.), which as will be described below, are used to collect requested micro-service telemetry data. Similarly, Contiv 454 has a monitoring agent 456 (examples of which are Coscale agent, New Relic agent, etc.), which as will be described below, are used to collect requested micro-service telemetry data.

Figure 5:
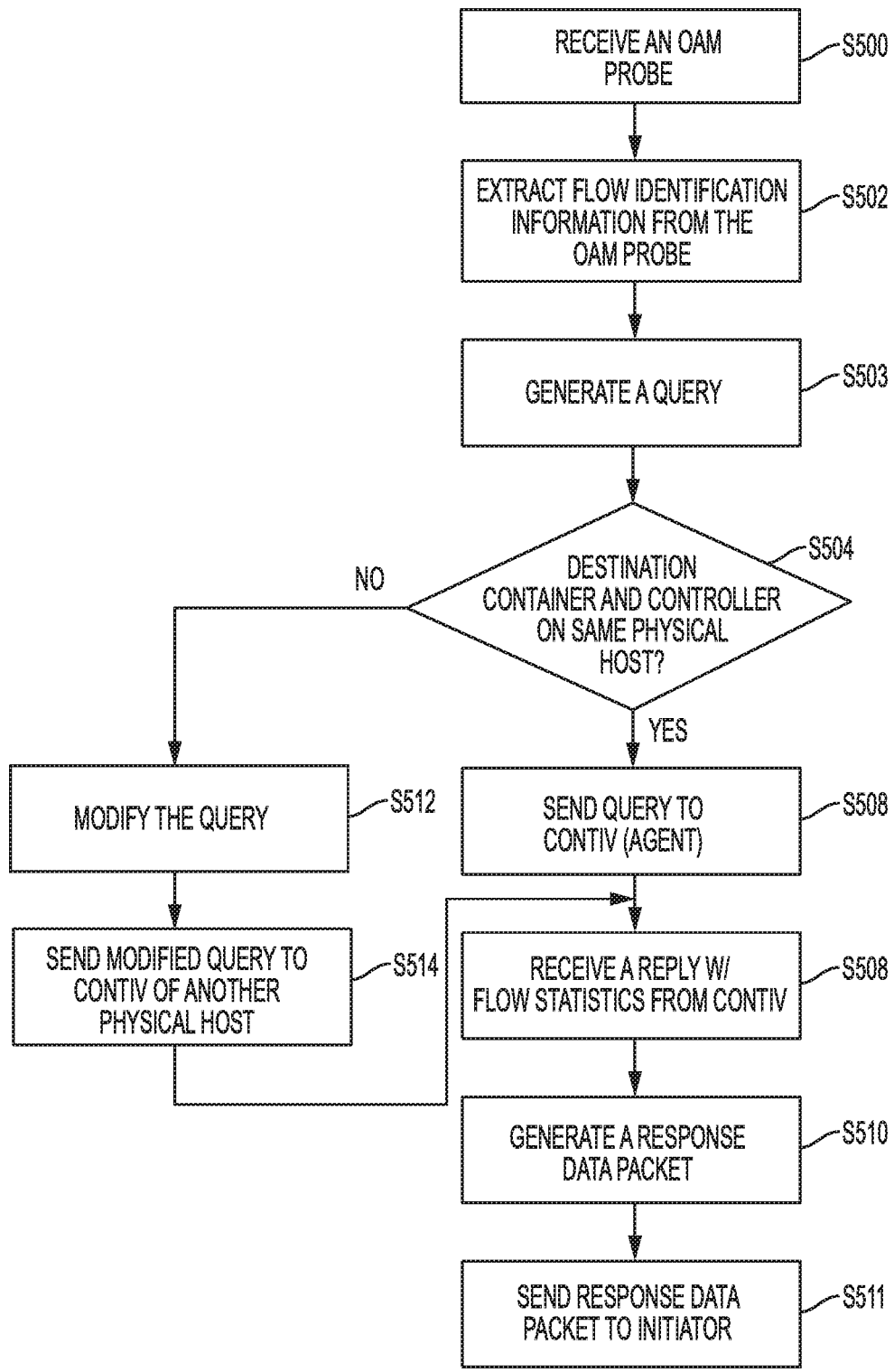
FIG. 5 describes a method of obtaining telemetry data on containers, according to an aspect of the present disclosure.

Hereinafter, a process of using an overlay termination endpoint as a proxy for obtaining telemetry data/flow statistics on containers (service functions) running on a host will be described, FIG. 5 describes a method of obtaining telemetry data on containers, according to an aspect of the present disclosure. FIG. 5 is described with reference to FIG. 4 and is from the perspective of container 408 (SFF 408) of FIG. 4. However, it will be understood that one or more processors that execute computer-readable instructions to function as container 408 perform the process of FIG. 5.

At S500, container 408 (which can also be referred to as a controller or an overlay termination endpoint or simply endpoint 408) receives an OAM probe from an initiator. The initiator can be a network operator accessing system 400 via a corresponding device, one or more clients endpoints 146 of FIG. 1B, etc. The OAM probe arrives at container 408 via cloud 132 and at physical port 404. The OAM probe can also be referred to as a probe for flow statistics. The OAM probe can be for various statistics/telemetry data for a specific data path (flow) to and from a service function (container). Examples of various path statistics/telemetry data include, but are not limited to, number of packets on the service path, number of bytes, rates for performance management such as packets per second, number of errors, etc. In one example, the initiator triggers a service function chaining trace (SFC trace), as known to those having ordinary skills in the art. Furthermore, the OAM probe includes identifying information of the specific data path/flow (flow identification information. Examples of flow identification information include, but are not limited to, a flow ID, a flow label, entropy details (e.g., load balancing as will be further described below with reference to FIG. 6), etc.

In one example, the OAM probe received at container 408 has a format (which will be further described below with respect to FIG. 6). The OAM probe includes a payload. At S502, container 408 extracts (obtains) the flow identification information from the payload together with entropy details of the OAM probe received at S500. Based on the obtained flow identification information and the entropy label, container 408 can determine a container that is the destination (destination container) of the corresponding data path (flow) and subsequently the virtual port (vport) via which Contiv 406 sends frame and data packets to the destination container for processing.

At S503, container 408 generates a query for the flow statistics based on the entropy label and the extracted flow identification information. In one example and as part of generating the query, container 408 includes (sets) a source MAC address (SMAC) (address of container 408), a destination MAC address (DMAC) (address of the destination container) for the flow and the entropy label details in a YANG query to be sent to Contiv 406. Yang is an example of a protocol/programming language used to generate the query. However, other known or to be developed protocols/programming languages can also be used.

At S504, container 408 determines whether the destination container is hosted/instantiated on the same physical host as container 408 (e.g., host 402) or a different host (e.g., host 450). In one example if the destination container is one of containers 410, 412 and 414, container 408 determines that the destination container is hosted on the same physical host 402 as container 408. However, if the destination container is container 452 hosted on physical host 450, container 408 determines that the destination container is hosted on a different physical host.

If at S504, container 408 determines that the destination container is hosted/instantiated on the same physical host as container 408, then at S506, container 408 sends the generated query to Contiv 406 (agent).

In one example, container 408 sends the query to Contiv 406 on south hound APIs such as "eth0" and vport1 shown in FIG. 4.

Upon receiving the query, Contiv 406 uses a local monitoring agent associated therewith (e.g., agent 418 associated with Contiv 406) to obtain the requested flow statistics.

Thereafter, at S508, container 408 receives a reply (response packet) back from Contiv 406 that includes the requested flow statistics. At S510, container 408 includes the reply in a data packet (generates a response packet) to be sent hack to initiator from which the OAM probe is received at S500. At S511, the generated response data packet is sent back to the initiator via physical port 404 and cloud 132.

Referring back to S504, if at S504, container 408 determines that the destination container is not hosted/instantiatic on the same physical host as container 408, at S512, container 408 modifies a query to include the IP address of the physical host (e.g., physical host 450) that hosts the destination container.

Then at S514, container 408 sends the modified query for the flow statistics to Contiv 454 (hosted on the different physical host 450). In one example and as part of the query, container 408 includes (sets) a source MAC address (SMAC) and a destination MAC address (DMAC) and include the entropy details obtained as part of the flow identification information in a YANG query to be sent to Contiv 454.

In one example, container 408 sends the query to Contiv 454 on south bound. APIs such as "eth0" and vport1 shown in FIG. 4.

Upon receiving the query, Contiv 454 uses a local monitoring agent associated therewith (e.g., agent 456 associated with Contiv 454) to obtain the requested flow statistics.

Thereafter, the process returns to S508, where container 408 receives a reply back from Contiv 454 that includes the requested flow statistics. This is then followed by the processes at S510 and S511, as described above.

Figure 6:
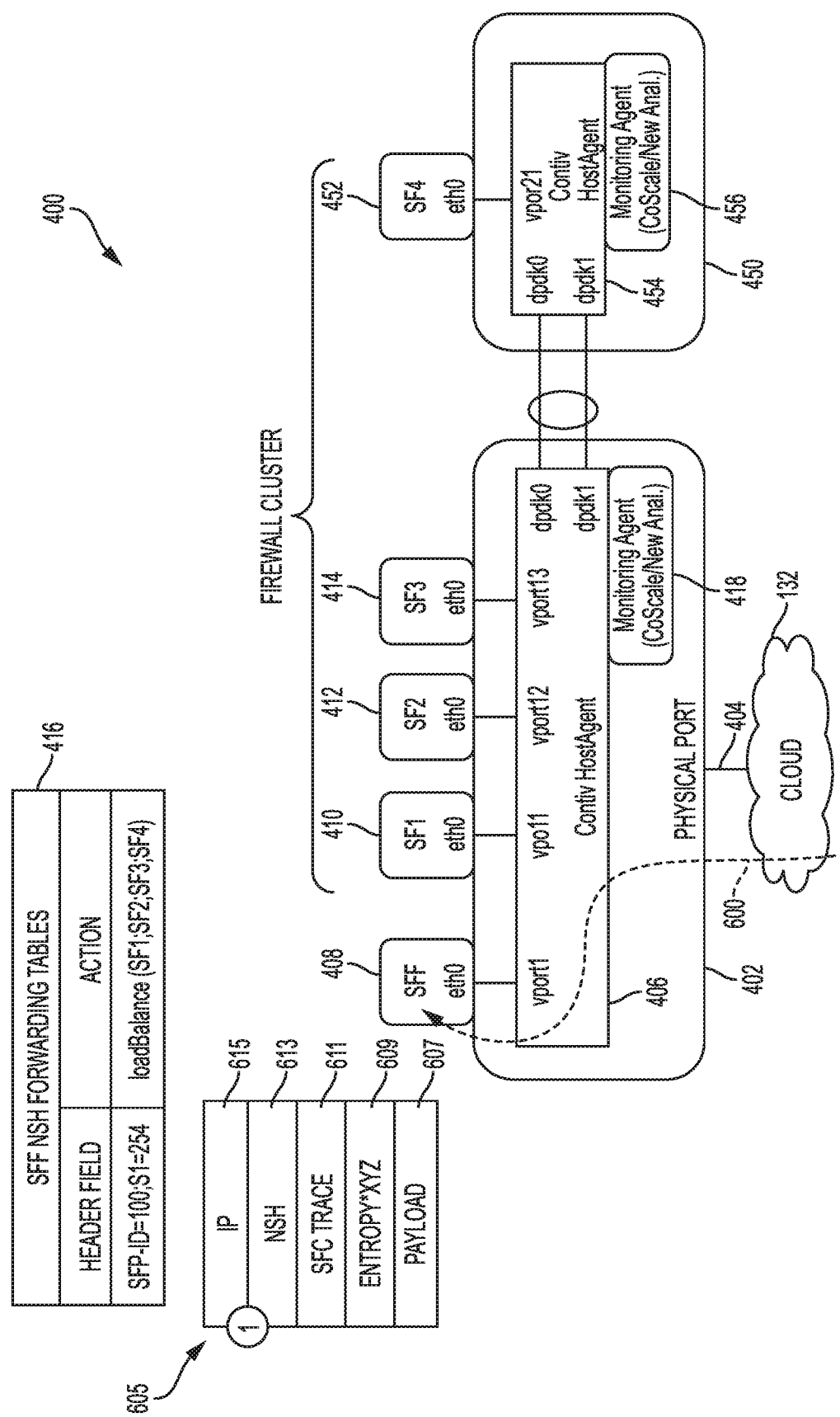
FIG. 6 illustrates an example of the process of FIG. 5, according an aspect of the present disclosure.

FIG. 6 illustrates an example of the process of FIG. 5, according an aspect of the present disclosure. In FIG. 6, dements that have the same numerical reference number as those shown in FIG. 4, operate in the same manner as described with reference to FIG. 4 and thus are not described again for sake of brevity.

As shown in FIG. 6, OAM probe 605 of S500 is received at Contiv 408 via cloud 132 and physical port 404 along path 600. OAM probe 605 has a format, mentioned above. According to example format, OAM probe 605 has payload 607, entropy details 609 (e.g., load balancing. "xyz" shown in FIG. 6 can be any action such as load balancing), SFC trace 611, network service header (NSH) 613 and IP header 615. In one example, instead of NSF 613, OAM probe can have SRv6 header 613. EVPN header 613 and/or IPv6 header 613.

Using information provided as part of OAM probe 605, container 408 determines how to manage OAM probe 605. For example and as described above, container 408 extracts entropy details 609 from OAM probe 605 and includes the same in the query sent to Contiv 406 or Contiv 454. Furthermore, by detecting the SFC trace 611, container 408 determines that the received packet is an OAM probe, which triggers container 408 to extract the entropy and flow identification information from payload 605 and initiate the process of obtaining flow statistics.

Figure 7:
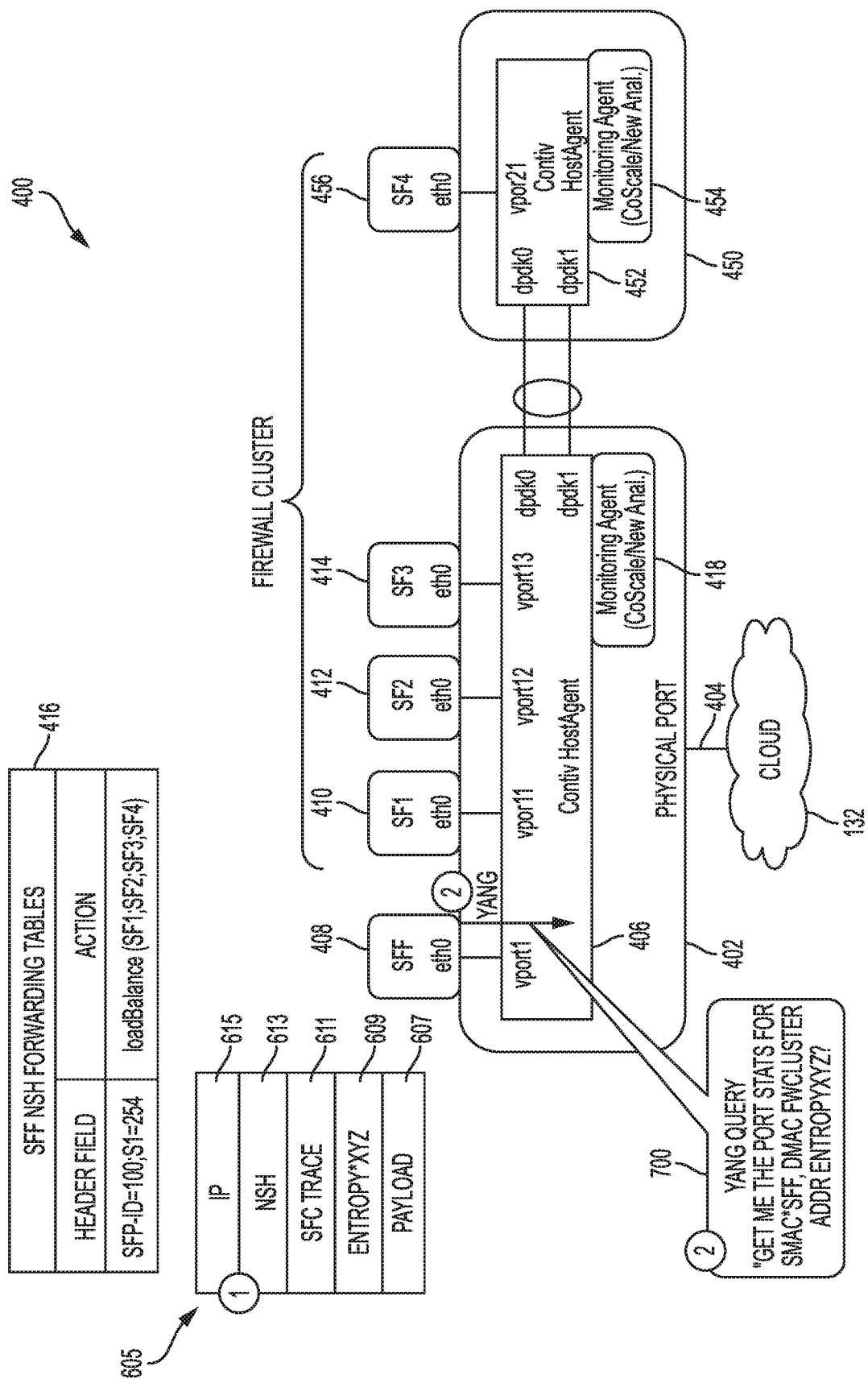
FIG. 7 illustrates an example of the process of FIG. 5, according an aspect of the present disclosure.

FIG. 7 illustrates an example of the process of FIG. 5, according an aspect of the present disclosure. In FIG. 7, elements that have the same numerical reference number as those shown in FIG. 4 and FIG. 6, operate in the same manner as described with reference to FIG. 4 and FIG. 6 and thus are not described again for sake of brevity.

As shown in FIG. 7, after receiving OAM probe 605 at S500 and extracting entropy details and other flow identification information, container 408 generates query 700, which can be a. YANG query. A pseudo example of such query 700 indicates a request for flow statistics associated with a port (a vport) having a starting MAC address of container 408 (SFF) and destination MAC address (FwCluster Addr such as vport 11, vport 12, vport 13 and/or vport 21).

One advantage of using an overlay termination endpoint such as container 408 as a proxy for obtaining flow statistics of service function paths, as described with reference to FIGS. 4-7 above, include elimination of the need for microservices enabled on each container to learn, understand and process overlay OAM probe packets. Another advantage is that using such proxy allows for inter-layer correlation for container performance in overlay data center deployments.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" refers to at least one of a set and indicates that one member of the set or multiple members of the set satisfy the claim. For example, claim language reciting "at least one of A and B" means A, B, or A and B.

What is claimed is:

1. A method comprising:
   determining, by a container, a destination container associated with a service path;
   determining, by the container, whether the destination container is on a same host as the container;
   in response to determining that the destination container is on the same host as the container, sending, by the container, a query for flow statistics associated with the destination container, the query including flow identification information;
   in response to determining that the destination container is not on the same host as the container, modifying the query to include an address of the host which hosts the destination container before sending the query;
   obtaining, by the container, the flow statistics based on the flow identification information;
   generating, by the container, a response with the flow statistics; and
   sending, by the container, the response to an initiator.

2. The method of claim 1, wherein the flow identification information includes a flow ID of the service path, a flow label of the service path and an entropy label data of the service path.

3. The method of claim 1, wherein the service path is a path through which a data packet traverses to be serviced by one of a plurality of containers.

4. The method of claim 3, further comprising:
   receiving, from the initiator, a probe for the flow statistics, the probe including the flow identification information; and
   extracting the flow identification information from the probe.

5. The method of claim 4, wherein the sending sends the query on a south bound API.

6. The method of claim 1, wherein the query includes a source address, a destination address associated with the destination container, and entropy details included in the flow identification information.

7. The method of claim 1, wherein the query is a YANG query.

8. The method of claim 1, further comprising:
   in response to the destination container being on the same host as the container, sending the query to an agent configured to manage a plurality of containers.

9. A system comprising:
   memory configured to store computer-readable instructions; and
   one or more processors configured to execute the computer-readable instructions that, when executed, cause the one or more processors to perform functions comprising:
   determining, by a container, a destination container associated with a service path;
   determining, by the container, whether the destination container is on a same host as the container;
   in response to determining that the destination container is on the same host as the container, sending, by the container, a query for flow statistics associated with the destination container, the query including flow identification information;
   in response to determining that the destination container is not on the same host as the container, modifying the query to include an address of the host which hosts the destination container before sending the query;
   obtaining, by the container, the flow statistics based on the flow identification information;
   generating, by the container, a response with the flow statistics; and
   sending, by the container, the response to an initiator.

10. The system of claim 9, wherein the flow identification information includes a flow ID of the service path, a flow label of the service path and an entropy label data of the service path.

11. The system of claim 9, wherein the service path is a path through which a data packet traverses to be serviced by one of a plurality of containers.

12. The system of claim 11, wherein the functions include:
receiving, from the initiator, a probe for the flow statistics, the probe including the flow identification information; and
extracting the flow identification information from the probe.

13. The system of claim 12, wherein,
the probe is an operation, administration and management (OAM) probe to obtain the flow statistics;
the OAM probe is received from the initiator, and
the initiator is configured to trigger a service function chaining trace to send the OAM probe.

14. The system of claim 12, wherein the query includes a source address, a destination address associated with the destination container and entropy details included in the flow identification information.

15. The system of claim 12, wherein the query is a YANG query.

16. One or more non-transitory computer-readable medium having computer-readable instructions stored therein, which when executed by one or more processors, cause the one or more processors to perform functions comprising:
determining, by a container, a destination container associated with a service path;
determining, by the container, whether the destination container is on a same host as the container;
in response to determining that the destination container is on the same host as the container, sending, by the container, a query for flow statistics associated with the destination container, the query including flow identification information;
in response to determining that the destination container is not on the same host as the container, modifying the query to include an address of the host which hosts the destination container before sending the query;
obtaining, by the container, the flow statistics based on the flow identification information;
generating, by the container, a response with the flow statistics; and
sending, by the container, the response to an initiator.

17. The one or more non-transitory computer-readable medium of claim 16, wherein the functions include:
receiving a probe for the flow statistics, the probe including the flow identification information; and
extracting the flow identification information from the probe.

18. The one or more non-transitory computer-readable medium of claim 16, wherein the flow identification information includes a flow ID of the service path, a flow label of the service path and an entropy label data of the service path.

19. The one or more non-transitory computer-readable medium of claim 16, wherein the service path is a path through which a data packet traverses to be serviced by one of a plurality of containers.

* * * * *